United States Patent
Nguyen et al.

(10) Patent No.: US 12,267,373 B2
(45) Date of Patent: Apr. 1, 2025

(54) IDENTIFICATION OF CLIENT DEVICE LOCATION DURING EMERGENCY

(71) Applicant: Zoom Video Communications, Inc., San Jose, CA (US)

(72) Inventors: Thanh Le Nguyen, Belle Chasse, LA (US); Curtis Wayne Palmer, Red Oak, TX (US); Jason Ramirez, McKinney, TX (US); Jeffrey Stanley, Hickory Creek, TX (US)

(73) Assignee: Zoom Communications, Inc., San Jose, CA (US)

( * ) Notice: Subject to any disclaimer, the term of this patent is extended or adjusted under 35 U.S.C. 154(b) by 99 days.

(21) Appl. No.: 18/084,073

(22) Filed: Dec. 19, 2022

(65) Prior Publication Data
US 2024/0205276 A1    Jun. 20, 2024

(51) Int. Cl.
*G06F 15/16* (2006.01)
*H04L 65/1069* (2022.01)
*H04L 65/1093* (2022.01)
*H04L 65/403* (2022.01)

(52) U.S. Cl.
CPC ........ *H04L 65/403* (2013.01); *H04L 65/1069* (2013.01); *H04L 65/1093* (2013.01)

(58) Field of Classification Search
CPC  H04L 65/403; H04L 65/1069; H04L 65/1093
See application file for complete search history.

(56) References Cited

U.S. PATENT DOCUMENTS

| | | | | |
|---|---|---|---|---|
| 9,225,753 | B1* | 12/2015 | Maxwell | H04M 1/72424 |
| 9,820,120 | B2* | 11/2017 | deCharms | H04W 4/02 |
| 10,692,032 | B2* | 6/2020 | Datta Ray | H04L 63/20 |
| 11,924,376 | B2* | 3/2024 | Anderson | H04M 3/42357 |
| 2008/0152112 | A1* | 6/2008 | Gayde | H04M 3/58 379/201.01 |
| 2009/0325595 | A1* | 12/2009 | Farris | G01C 21/206 455/456.1 |
| 2014/0177503 | A1* | 6/2014 | Sayeed | H04L 65/80 370/312 |
| 2014/0273915 | A1* | 9/2014 | Corley | H04W 4/90 455/404.1 |
| 2016/0049064 | A1* | 2/2016 | McNabb | G01C 21/206 340/540 |

(Continued)

*Primary Examiner* — Ario Etienne
*Assistant Examiner* — Thorne E Waugh
(74) *Attorney, Agent, or Firm* — Kilpatrick Townsend & Stockton LLP

(57) ABSTRACT

Systems and methods for identification of a client device location during an emergency are provided herein. In an example, a method includes receiving, by a video conference provider, a request to initiate an emergency beacon and determining, by the video conference provider, a first client device associated with the request. The method may also include activating, by the video conference provider, the emergency beacon for the first client device and establishing, by the video conference provider, a virtual session based on the emergency beacon. The method may also include joining, by the video conference provider, the first client device to the virtual session without input from the first client device and transmitting, by the video conference provider, a request to join an authorized device to the virtual session.

20 Claims, 13 Drawing Sheets

(56) References Cited

U.S. PATENT DOCUMENTS

| | | | |
|---|---|---|---|
| 2016/0192166 A1* | 6/2016 | deCharms | H04N 7/148 |
| | | | 348/14.02 |
| 2016/0269535 A1* | 9/2016 | Balabhadruni | H04M 1/72424 |
| 2017/0169699 A1* | 6/2017 | Will | H04W 4/90 |
| 2017/0310826 A1* | 10/2017 | Gunasekar | G06Q 10/1095 |
| 2021/0037368 A1* | 2/2021 | Pellegrini | H04M 1/72418 |
| 2024/0146777 A1 | 5/2024 | Rubery et al. | |
| 2024/0146778 A1 | 5/2024 | Rubery et al. | |
| 2024/0146785 A1 | 5/2024 | Rubery | |

* cited by examiner

IDENTIFICATION OF CLIENT DEVICE LOCATION DURING EMERGENCY

FIELD

The present application generally relates to video conferences and more particularly relates to systems and methods for identifying a location of a client device during an emergency.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
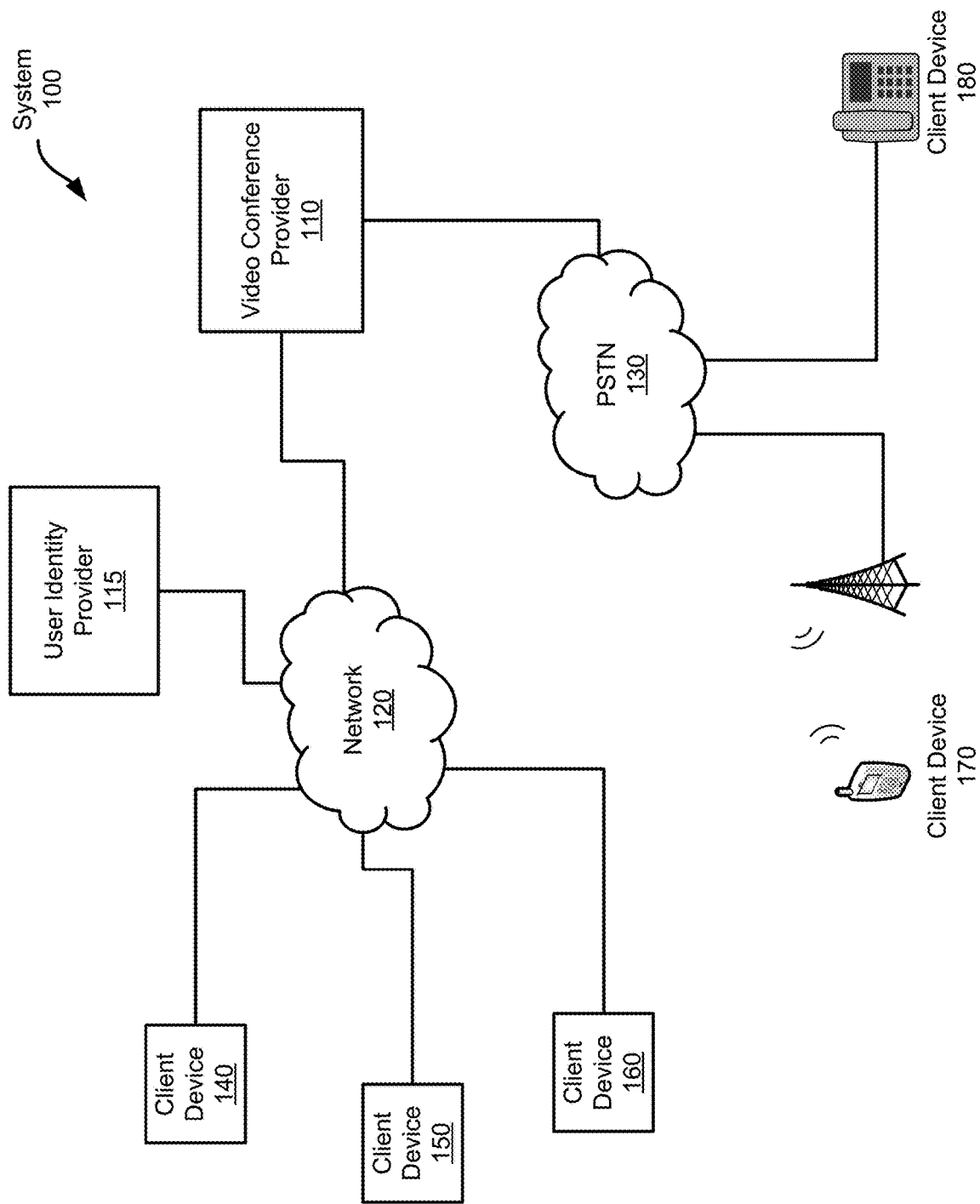
FIGS. 1, 2, and 3 show example systems for identifying a location of a client device during an emergency, according to an embodiment herein.

Examples are described herein in the context of systems and methods for identifying a location of a client device during an emergency. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Recent tragic events highlight the limits of first responder accessibility. As other areas of modern daily life become increasingly virtual and connected, many facilities and venues remain isolated and inaccessible via virtual means to first responders and aid. That is, incidents in facilities, whether the facility be places of worship, schools, universities, or businesses, present unique communication and situational awareness challenges to officials and first responders. Even when a facility has a dedicated security system, it may be difficult to access for officials and first responders, can have limited distribution capabilities, and rarely permits two-way communication between individuals outside of the facility and those inside.

A common problem for current systems is that communications are often routed back to a central console or location, such as a locked room. Having a central console for security systems can be problematic in that the room housing the central console often is inadequately sized for a response team. Even if the security system allows for remote access, it is often difficult or impossible to grant access to officials and first responders during an incident. These access issues can be exacerbated during multi-agency responses, creating significant command and control challenges.

Another common problem for current systems is the time delay required to identify a location of those in need of help. For example, individuals in need of help are often unable to readily alert officials of their location or officials are unable to quickly identify the location of an individual in need of assistance. During emergency situations, any time delay can impact response efforts.

To aid and increase response times during emergency situations, example systems and methods for identification of a client device location during an emergency are provided herein. Modern collaboration platforms, such as video conference platforms, aggregate and route numerous multimedia streams seamlessly to any connected endpoints, whether fixed or mobile. For example, video conference providers can enable people to interact with each other using their own computers (or "client devices") with both video and audio in a variety of settings, such as in one-on-one conversations, group meetings, and webinars. As described in greater detail with respect to the example systems and methods provided herein, the structure provided by video conference providers can be leveraged to identify the location of individuals in need of help during emergency events. Moreover, the video conferencing structure can provide officials and first responders dispersed and remote access to individuals in need of assistance, including the ability to gain visual and audio access and participate in two-way communication with those individuals.

According to one embodiment, an emergency beacon may be activated to identify the location of a client device associated with an individual in need of assistance. If the client device is enrolled in an emergency beacon system, then the client device may request to initiate an emergency beacon or may be requested to initiate an emergency beacon. Upon initiation of the emergency beacon, a virtual session may be established between a video conference provider and the client device. The virtual session may be used to identify a location of the client device. For example, the location of the client device may be determined based on information obtained by the client device or one or more connections established by the client device, such as an IP address, a Bluetooth connection, global positioning system (GPS) data, or cellular network data. The video conference provider may use this information to determine the location of the client device and provide the location information to responders.

In some embodiments, the virtual session established with the client device may be utilized to collect audiovisual content from the client device. This can allow officials and first responders to utilize the client device in an emergency situation to gather vital information regarding the vicinity around the client device or the state of the individual in need of aid. Moreover, when the client device is joined to the virtual session, officials and first responders may be able to engage in communication with the individual in need if he or she is within the vicinity of the client device. For example, officials can speak to an individual trapped in a room due to a natural disaster, providing the individual instructions on safe routes for rescue.

This illustrative example is given to introduce the reader to the general subject matter discussed herein and the disclosure is not limited to this example. The following sections describe various additional non-limiting examples and examples of systems and methods for identifying a location of a client device during an emergency.

Referring now to FIG. 1, FIG. 1 shows an example system 100 that provides video conferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
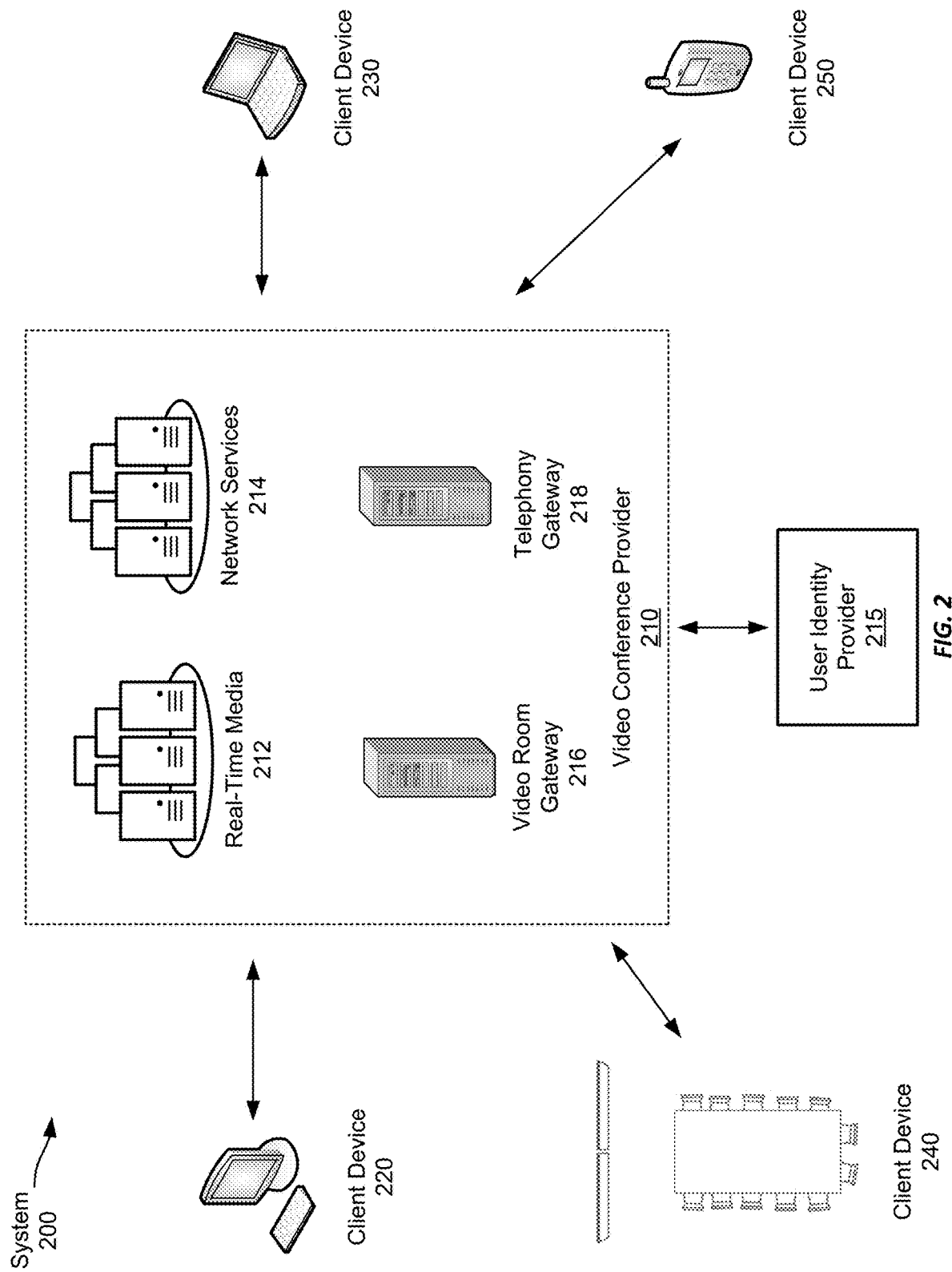

Video conference provider 110 allows clients to create video conference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common video conference may be used.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host. In some embodiments, a barcode or QR code may be generated to expedite sharing of a meeting invitation or the record for the meeting.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides video conferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting, or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosted by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
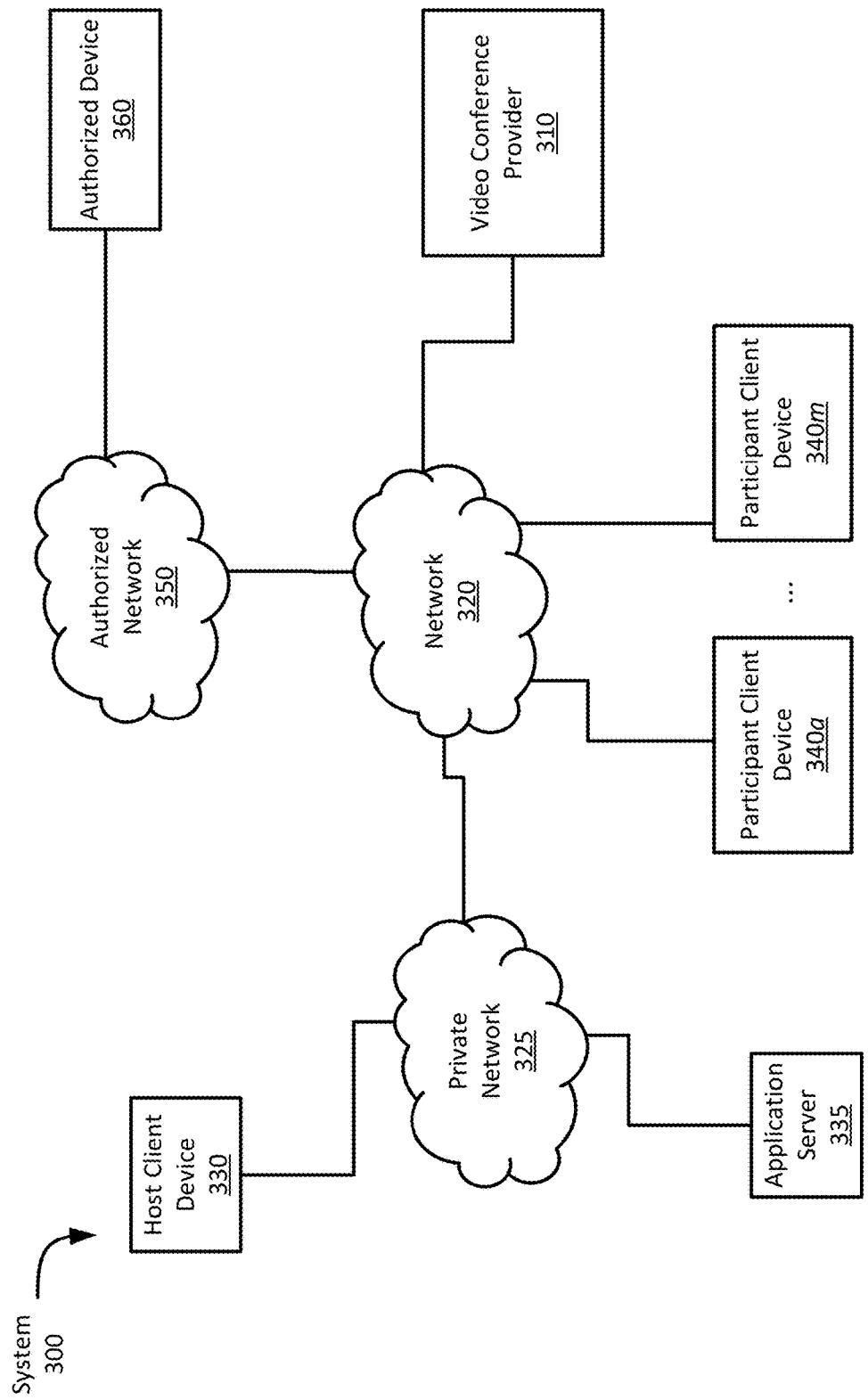

Referring now to FIG. 3, FIG. 3 shows an example system 300 for identifying a location of a client device during an emergency, according to an embodiment herein. In this example, a video conference provider 310 provides video conference services to multiple different client devices 330 and 340a-m, generally as described above with respect to FIGS. 1 and 2. In this example, the client devices 330 and 340a-m participate in a meeting hosted by the video conference provider 310. Client devices 340a-m connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications to access business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a virtual meeting ("meeting") at the video conference provider 310, such as by beginning a scheduled meeting, generally as described above with respect to FIGS. 1 and 2. The video conference provider 310 may create and manage the meeting as discussed above.

Once the virtual meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the meeting or certain select participants that will be engaged in discussions during the virtual meeting, such as panelists in a panel discussion. Still other limits may be imposed on the various participants, such as their ability to react to occurrences during the meeting, e.g., participants may be allowed to interact with their GUI to raise their hand to ask a question, but may not be allowed to provide any other feedback.

During the meeting, one of the participant client devices 340*a*-*m* or the host client device 330 may request to record the meeting. The request to record the meeting may be transmitted to the video conference provider 310. In some embodiments, the video conference provider 310 may prompt the non-requesting client devices with a notification that the meeting is going to be recorded. For example, if the host client device 330 request to record the meeting, the participant client devices 340*a*-*m* may receive a notification that the meeting is going to be recorded. Once the meeting request is accepted, the video conference provider 310 may record the audio and video streams from all of the client devices, 340*a*-*m* and 330, until the recording is terminated, or the meeting is ended.

In some embodiments, instead of hosting a virtual meeting, the video conference provider 310 may be requested to activate an emergency beacon. As will be described in greater detail with respect to FIGS. 4-9, the video conference provider 310 may receive a request to activate an emergency beacon from a client device, such as the client device 340*a*. In another embodiment, the video conference provider 310 may receive the request to activate the emergency beacon from another client device, such as from a client device associated with a facility's security team.

In some embodiments, to activate the emergency beacon, the client device, such as the client device 340*a*, may have previously accepted to be part of an emergency beacon system. For example, the client device 340*a* may have received a request to be part of the emergency beacon system upon installation of software associated with the video conference provider 310. In an example scenario, upon joining a virtual meeting hosted by the video conference provider 310 for the first time, the client device 340*a* may receive a request to allow the client device to be part of an emergency beacon system in the event of an emergency incident. If the request is accepted, then the client device 340*a* may be able to utilize the emergency beacon functions described herein.

An emergency beacon may be activated in the event of an incident. An incident event may include any variety of emergency or emergent situations, such as natural disasters, fires, unauthorized persons, unruly visitors, or any other events that pose risk of harm to individuals within a facility. An incident event is typically initiated/identified by an individual within the facility (such as the pulling of a fire alarm by a student or pressing an incident button by an administrator). However, an incident event may also be automatically triggered (such as by a smoke alarm or other sensor used to passively monitor an area for potential emergencies).

In some embodiments, once an incident event (also referred to herein as an "incident") is identified, a request may be sent to the video conference provider 310 to activate an emergency beacon for the client device 340*a*. As can be appreciated, the request may be sent to the video conference provider 310 by personnel trying to locate individuals within the facility or responders trying to determine which individuals are still in the facility.

In other embodiments, the client device 340*a* may send the request to activate the emergency beacon to the video conference provider 310 before or after an incident is identified. That is, an individual may identify the incident himself or herself, and thus request activation of the emergency beacon. For example, the individual may fall down a flight of stairs and require aid. As such, the individual may request activation of the emergency beacon so that first responders can locate him or her within the stairwell. In another example, the individual may request activation of the emergency beacon during an incident, such as a fire or natural disaster, to help first responders identify their location.

Upon receiving the emergency beacon request, the video conference provider 310 may determine the client device associated with the request. For example, the video conference provider 310 may receive the emergency beacon request from a building official to locate an individual. Based on the information provided about the individual (e.g., name, title, phone number, email address), the video conference provider 310 may determine that the client device 340*a* is associated with the individual and is therefore associated with the request. In another embodiment, the video conference provider 310 may receive the request from a client device and determine that the request was received from the client device 340*a* that is part of the emergency beacon system.

The video conference provider 310 may establish a virtual session based on the emergency beacon. A virtual session may be the same or similar to a virtual meeting hosted by the video conference provider 310. For example, the video conference provider 310, upon establishing the virtual session, may receive one or more multimedia streams from the client devices 340*a*. If a virtual session is established responsive to the emergency beacon, then only the client device 340*a* may be joined to the virtual session until an authorized device 360 is joined to the virtual session. As will be described in greater detail below, an authorized device 360 may be a client device associated with an official, administrator, or a first responder.

One difference between a conventional virtual meeting and a virtual session provided herein may be that the client device 330*a* may be automatically joined to the virtual session. That is, if a client device, such as the client device 340*a*, is in a powered-on state, and previously accepted to be part of the emergency beacon system, then the video conference provider 310 may automatically join the client device 340*a* to the virtual session without any input from the client device 340*a*. If the client device did not previously accept to be part of the emergency beacon system, then the video conference provider 310 may transmit a request for the client device to join the emergency beacon system, and thereafter be joined to the virtual session, such as following approval by a user of the client device. The request to join the emergency beacon system, regardless of the timing (e.g., prior to an incident event or during an incident event) may require input from a user of the receiving client device.

Once a client device, such as the client device 340*a*, is joined to the virtual session, the video conference provider 310 may gain control of any multimedia stream transmissions to and from the client device 340*a*. Specifically, the video conference provider 310 may gain access to and control over equipment on the client device 340*a* for generating and transmitting an audio stream, a video stream, or a messaging stream to and from the client device 340*a*. As will be described in greater detail below, this can allow for an authorized agency (e.g., officials and first responders) to use the client device 340a to gather information regarding a status of the individual associated with the client device 340a, information on an incident within the vicinity of the client device 340a, and potential response information, such as open exit routes. For example, the authorized agency can receive a video stream from the client device 340a of the area around the client device 340a or the authorized agency can send a message to the individual of the client device 340a providing response information (e.g., safe exit routes, first aid information).

An authorized device may also be joined to the virtual session to assist in the response to the identified incident event. For example, upon receipt of the emergency beacon request or initiation of the virtual session, the video conference provider 310 may communicate with an authorized network 350 to join an authorized device 360 to the virtual session. Importantly, the authorized network 350 may not be contacted until authorization is received. For example, on-site security, management, or authorized personnel from the facility may review an incident event to determine whether the authorized network 350 should be contacted. If the on-site security determines that the incident event requires assistance from authorities or first responders, then a request to join the virtual session may be transmitted to the authorized network 350. In another example, the on-site security, management, or authorized personnel may be associated with the authorized device 360. In such cases, it may be determined not to contact outside responders, such as local authorities or first responders, and the authorized device 360 joined to the virtual session may be associated with the on-site security, management, or authorized personnel. It can be appreciated, that in the event that the authorized device 360 is associated with an on-site client device, then the authorized network 350 may be the same as the network 320 through which the client device 340a is connected with the video conference provider 310.

In some embodiments, the video conference provider 310 may determine an appropriate authorized network 350 to contact. In an example embodiment, the video conference provider 310 may determine an appropriate authorized network 350 based on the location of the incident event, the type of incident event, or based on protocols established by the facility in which the incident event is occurring. For example, if the incident event is a hurricane that is endangering the facility, and the individuals therein, the video conference provider 310 may determine that the Federal Emergency Management Agency (FEMA) is an appropriate authorized network 350 to contact. In another example, if the incident event is an unauthorized person that has entered the facility, the video conference provider 310 may determine that the local first responder station is the appropriate authorized network 350 to contact. In some embodiments, instead of the video conference provider 310 making this determination, a third party may make this determination.

In some embodiments, instead of determining an appropriate authorized network 350 to contact, the video conference provider 310 may contact the authorized network 350 and the authorized network 350 may make the determination of an appropriate authorized device 360 to engage. That is, the authorized network 350, based on information provided by the video conference provider 310 may make the determination of what authorized device 360 to contact and join to the virtual session. The determination may be based on the same information as noted above, such as the location of the incident event, type of incident event, or the procedures of the facility in which the incident event is occurring.

To provide secure access to the client device 340a, the authorized network 350 may be a first responder specific network. For example, the authorized network 350 may include or be similar to AT&T's™ FirstNet network. In another example, the authorized network 350 may include an internal safety team within the facility or within the video conference provider 310's network. Any connection established during a virtual session would not be accessible to the public without proper authentication through either the video conference provider 310 or the authorized network 350.

Once the authorized network 350 is contacted by the video conference provider 310, an authorized device 360 may be joined to the virtual session. It should be understood that although for the following examples the authorized device 360 is described as singular, any number of authorized devices 360 may be joined to the virtual session. The authorized device 360 may be any client device used by an authorized agency to connect to the authorized network 350.

Upon joining the authorized device 360 to the virtual session, the video conference provider 310 may grant the authorized device 360 host controls over the virtual session. Host controls for a virtual session may include standard host controls and abilities as well as the ability of the authorized device 360 to control equipment of any client device joined to the virtual session used to generate a multimedia stream. Example equipment include a client device's microphone, camera, speaker, and, in some cases, messaging applications.

During a virtual session, the authorized device 360 may access and control equipment of a client device, such as the client device 340a, to access the area around the client device 340a. For example, the authorized device 360 may activate a microphone and a camera of the client device 340a such to receive an audio stream and a video stream from the client device 340a. In another example, the authorized device 360 may transmit a message to the client device 340a via a speaker on the client device 340a or may transmit a chat message to the client device 340a via a display on the client device 340a. Once the client device 340a joins the virtual session, thereby granting the authorized device 360 access and control over the equipment of the client device 340a, no input may be required from the client device 340a to control the equipment of the client device 340a.

The host controls granted to the authorized device 360 may also allow the authorized device 360 to join additional authorized devices to the virtual session. In other words, if the authorized device 360 is granted host controls, the authorized device 360 may invite and join a second authorized device, such as an authorized device from a separate authorized agency. For example, if the authorized device 360 is from the on-site security personnel, the authorized device 360 may join a second authorized device from a local first responder department. Since the on-site security personnel is familiar with the facility, the authorized device 360 may stay in the virtual session to assist the local first responder department in the response efforts.

The host controls may also allow the authorized device 360 to grant another client device host controls. Following the example above, if the second authorized device from the state-level first responder department is joined to the virtual session, the authorized device 360 may grant the second authorized device host controls so that the state-level first responder department can receive and control audio and video streams from the client device 340a. This can allow multiple authorized agencies to monitor and respond to an incident simultaneously.

In some embodiments, upon establishing the virtual session, the video conference provider 310 may determine a location of the client device 340a. For example, the video conference provider 310 may use information from the client device 340a to determine the location of the client device 340a. Information from the client device 340a may include an IP address associated with the client device 340a, a Bluetooth connection established with the client device 340a, GPS data associated with the client device 340a, or cellular network data from the client device 340a.

Figure 4:
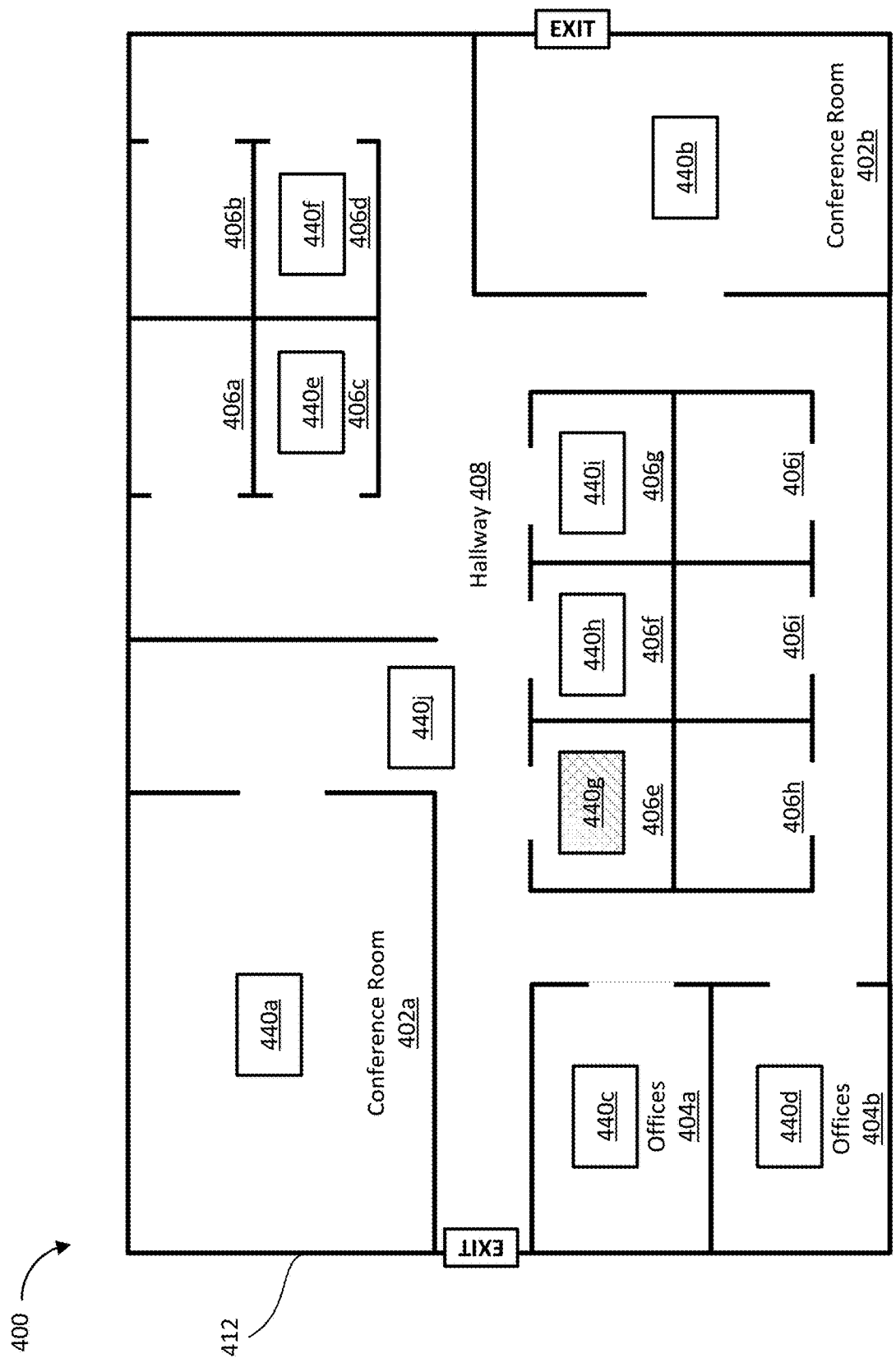
FIG. 4 illustrates an example overview of an example building having multiple client devices, according to an embodiment herein.

Referring now to FIG. 4, an illustrative example of an emergency beacon system 400 is provided, according to an embodiment herein. According to the illustrated example of FIG. 4, the emergency beacon system 400 may be present within a facility 412. The facility 412 may be a building, such as a school, hospital, or business. As shown, the facility 412 may include numerous rooms, including conference rooms 402a and 402b, offices 404a and 404b, and cubicles 406a-406j. The facility 412 may also have other spaces, such as a hallway 408.

Within the facility 412, there may be client devices, such as computers, cell phones, or video conference systems. For example, client devices 440a and 440b may be in the conference rooms 402a and 402b, client devices 440c and 440d may be in the offices 404a and 404b, and the client devices 440e-440i may be in cubicles 406c-406g, respectively. Additionally, a client device 440j may be in the hallway 408. The client devices 440a-440j may be the same or similar to the client devices 340a-340m.

One or more of the client devices 440a-440j may be part of the emergency beacon system 400. For example, one or more of the client devices 440a-440j may have accepted a request to be part of an emergency beacon system 400 if an incident event was identified within the facility 412. As noted above, during an initial setup of a video conference application or upon joining or entering the facility 412, each of the client devices 440a-440j may have received a prompt to be part of the emergency beacon system 400 in case of emergency. If the client devices 440a-440j accepted the request to be part of the emergency beacon system 400, then the client devices 440a-440j may be able to transmit a request to activate an emergency beacon or be automatically joined to a virtual session in response to a request to activate an emergency beacon. In contrast, if the client devices 440a-440j decline to be part of the emergency beacon system 400, then the client devices 440a-440j may not have access or be able to activate the emergency beacon in the event of an incident.

In the event of an incident, such as a fire, unauthorized person, tornado, etc., a video conference provider, such as the video conference provider 310, may receive a request to activate an emergency beacon for a specific client device. For example, the request to activate the emergency beacon may be received from a client device, such as the client device 440g, or the request may include information corresponding to a specific client device, such as the individual associated with the client device 440g.

Responsive to the request to activate the emergency beacon, the video conference provider 310 may determine the client device associated with the request and activate the emergency beacon for the client device. For example, the request may be received from on-site security personnel including information on the individual associated with the client device. Based on this information, the video conference provider 310 may determine that the client device 440g is associated with the request. Upon identification of the client device 440g, the video conference provider 310 may activate the emergency beacon for the client device 440g.

In some embodiments, activation of the emergency beacon for the client device 440g may establish a connection between the client device 440g and the video conference provider 310. For example, the video conference provider 310 may establish a virtual session with the client device 440g. As noted above, a virtual session may be similar to a virtual meeting in that the video conference provider 310 may connect to the client device 440g to transmit to and receive transmissions from the client device 440g within the virtual session. A difference, however, between the virtual session and conventional virtual meetings may be that the client device 440g, upon activation of the emergency beacon, may be automatically joined to the virtual session without any input on the client device side. Moreover, in some embodiments, the multimedia streams to and from the client device 440g may be controlled by the video conference provider 310 or an authorized device, such as the authorized device 360, which may include activating a camera or microphone or adjusting an orientation of one or both of these.

In some embodiments, activation of the emergency beacon may also include a notification on the client device side that the emergency beacon has been activated. For example, the client device 440g may receive a notification that the emergency beacon is activated. In some embodiments, the notification may include an indication that assistance is on its way or the client device 440g will soon be in communication with officials or first responders.

In other embodiments, responsive to activation of the emergency beacon, the video conference provider 310 may determine a location of the client device 440g. For example, activation of the emergency beacon may cause the client device 440g to emit a beacon for location identification. That is, the activation of the emergency beacon may cause the client device 440g to turn-on Bluetooth or WiFi connectivity. In another embodiment, activation of the emergency beacon may cause the client device 440g to emit a radio signal, such as a radio-frequency identification (RFID) or near field communication (NFC) signal. In still another embodiment, the video conference provider 310 may determine an IP address, a Bluetooth connection, GPS data, or cellular network data associated with the client device 440g (e.g., information from the client device 440g). The video conference provider 310 may use this information from the client device 440g or an emitted radio signal from the client device 440g to determine the location of the client device 440g.

As should be appreciated, if the client device 440g is connected to a local WiFi network within the facility 412, that WiFi connection may be used to determine the location of the client device 440g. Similarly, if the client device 440g has a Bluetooth connection with another nearby client device, such as the client device 440h, then that Bluetooth connection may be used to determine the location of the client device 440g. While the above discussion relates to determining the location based on a single connection, it should be appreciated that more than one connection with the client device 440g may be used to determine the location of the client device 440g. For example, multiple Bluetooth connections may be used to triangulate the location of the client device 440g or cellular data, an IP address, and a Bluetooth connection with the client device 440h may be used in combination to determine the location of the client device 440g.

Once a virtual session is established, an authorized device, such as the authorized device 360 may be joined to the virtual session. In some embodiments, the video conference provider 310 may transmit a request to join the authorized device 360 to the virtual session responsive to its establishment.

Figure 5:
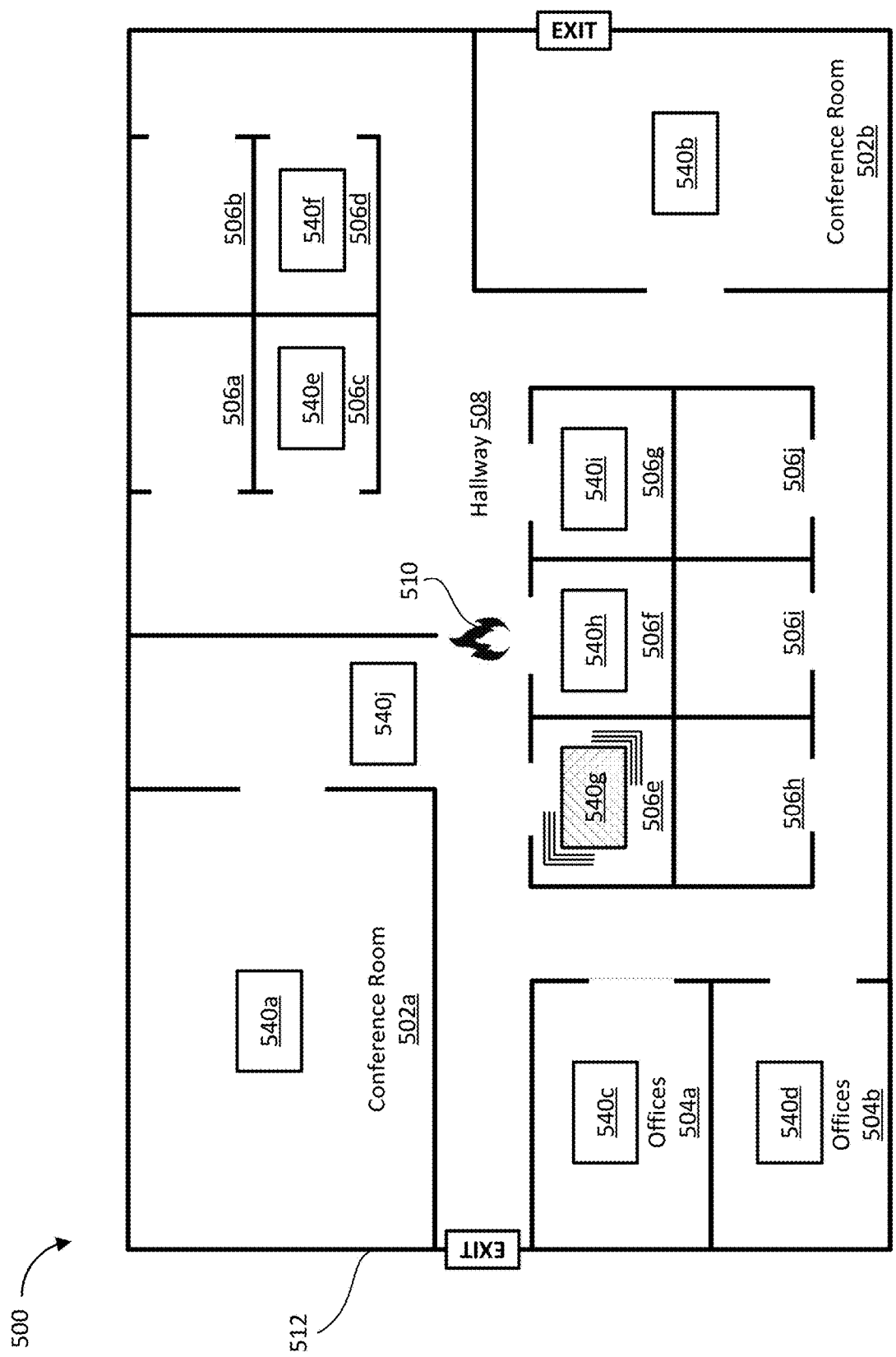
FIG. 5 illustrates an example overview of activating an emergency beacon to locate a client device, according to an embodiment herein.

Turning now to FIG. 5, an example overview of activating an emergency beacon to locate a client device is illustrated. The emergency beacon system 500 may be the same or similar to the emergency beacon system 400, including client devices 540a-540j being the same or similar to the client devices 440a-440j. As illustrated, a facility 512 may be the same or similar to the facility 412, including conference rooms 502a and 502b, offices 504a and 504b, and cubicles 506a-506j being the same or similar to the conference rooms 402a and 402b, the offices 404a and 404b, and the cubicles 406a-406j, respectively. The facility 512 may also include a hallway 508 that is similar to the hallway 408.

As illustrated, an incident 510 may occur within the facility 512. According to the illustrated example, the incident 510 may be a fire within the facility 512. In this example, an individual associated with the client device 540g may transmit a request to activate an emergency beacon due to the incident 510. For example, the individual associated with the client device 540g may be trapped by the fire, may have collapsed due to the event that caused the incident 510, or may be seeking help with safe rescue routes. In another example, the request to activate the emergency beacon for the client device 540g may be sent by an on-site security team or first responders trying to identify individuals in the facility 512.

In some embodiments, prior to or responsive to activation of emergency beacon for the client device 540g, the video conference provider 310 may determine a status of the client device 540g. For example, the video conference provider 310 may determine whether the client device 540g is operable, activated, or the last time that the client device 540g was activated. The status of the client device 540g may provide information corresponding to the location or status of the individual associated with the client device 540g. For example, if the client device 540g is activated, this can indicate that the individual associated with the client device 540g is near the client device 540g. In contrast, however, if the client device 540g was last active an hour ago, this may indicate that the individual associated with the client device 540g may not be within the vicinity of the client device 540g or may be in a state unable to activate the client device 540g. As used herein, activation of the client device 540g for the above discussion may include interaction with the client device, such as logging into one or more applications or using an application on the client device.

Figure 6:
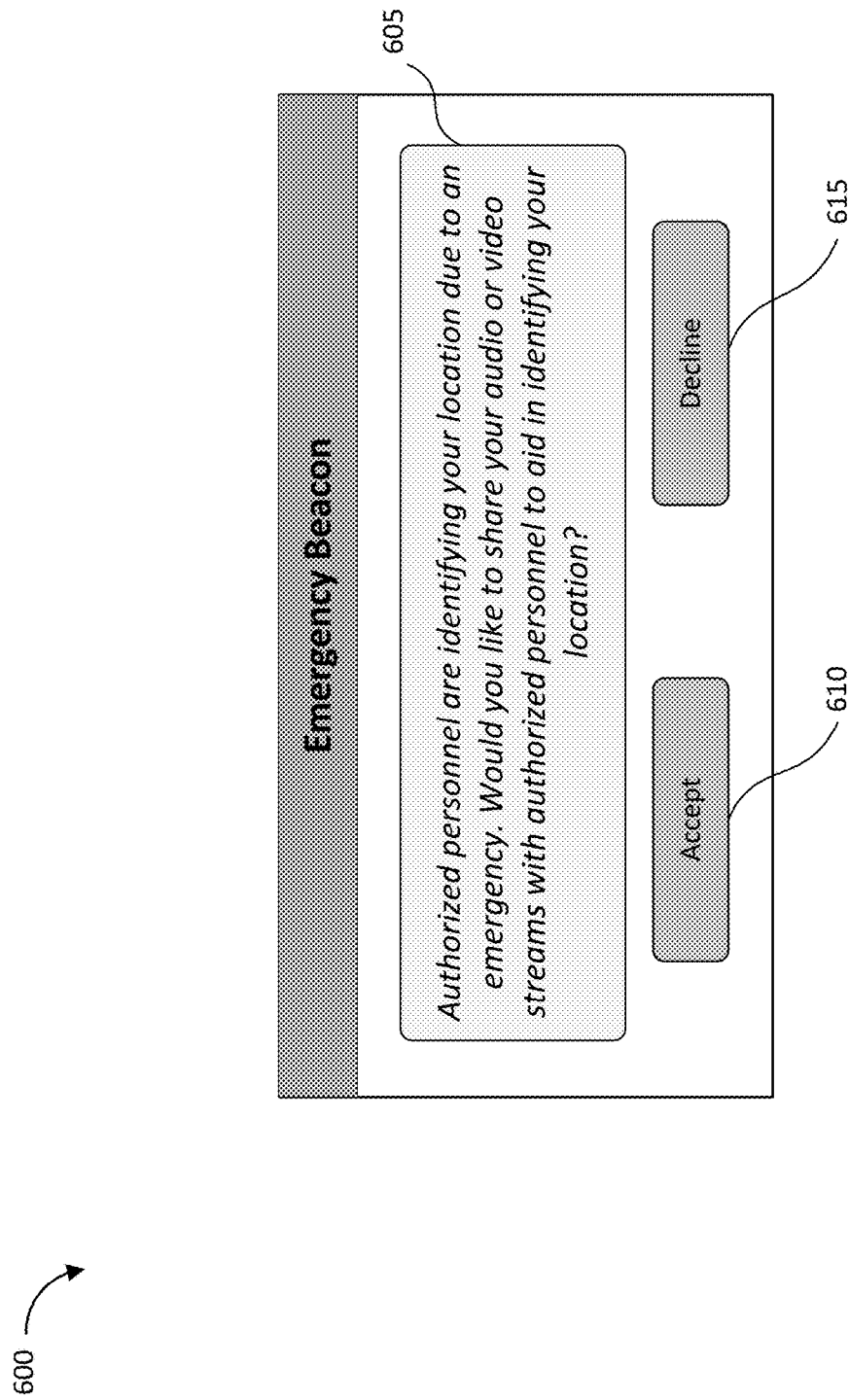
FIG. 6 illustrates an example emergency beacon alert, according to an embodiment herein.

The video conference provider 310 may activate the emergency beacon for the client device 540g. As noted above, in response to activation of the emergency beacon, the client device 540g may receive a notification of the activation. Referring now to FIG. 6, an example emergency beacon alert 600 is illustrated, according to an embodiment herein. The emergency beacon alert 600 may be transmitted to the client device 540g and the client device 540g may be prompted to display the emergency beacon alert 600. The emergency beacon alert 600 may include information 605 regarding the circumstances of the emergency beacon alert 600. As can be appreciated, if the client device 540g didn't transmit the request (e.g., another client device submitted the request to activate the emergency beacon for the client device 540g), an individual associated with the client device 540g may have little context for the emergency beacon alert 600.

As illustrated, the information 605 may indicate that authorized personnel are identifying a location of the client device 540g due to an emergency. The specific text of the information 605 may vary depending on the application, incident, and preferences of a given facility. The information 605 may also include a prompt to indicate that the authorized personnel would like to use one or more multimedia streams from the client device to aid in identifying the location of the client device. In this example, the emergency beacon alert 600 may include a button 610 to accept the request to use the audio or video streams from the client device and a button 615 to decline the request. Upon selection of button 610, the video conference provider 310 may establish a virtual session with the client device. If the button 615 is selected, a virtual session may not be established with the client device. In other embodiments, selection of the buttons 610 and 615 may relate only to the sharing of multimedia streams from the client device with an authorized device. For example, if the button 610 is selected, then an authorized device, such as the authorized device 360 may be granted control over the multimedia streams of the client device. If the button 615 is selected, then the authorized device may not be granted control over the multimedia streams from the client device 540g.

It should be understood that in some embodiments, the emergency beacon alert 600 may merely note that an audio or video stream from the client device may be shared with authorized personnel and not provide the buttons 610 and 615 to accept or decline the sharing. In some embodiments, one or more multimedia streams from the client device may be automatically shared with the video conference provider 310, and in turn with an authorized device via the virtual session upon activation of the emergency beacon.

Returning now to FIG. 5, to provide assistance to the individual associated with the client device 540g, the video conference provider 310 may establish a virtual session with the client device 540g. As noted above, the virtual session may allow the video conference provider 310 to receive transmission of one or more multimedia streams from the client device 540g. In some embodiments, upon establishment of the virtual session, the video conference provider 310 may request to join an authorized device, such as the authorized device 360, to the virtual session. Due to the nature of the incident 510 (e.g., a fire), the video conference provider 310 may determine that the local fire department is the appropriate authorized agency to contact. As such, the video conference provider 310 may connect with an authorized agency network for the local fire department and an authorized device from the local fire department may be joined to the virtual session.

Once the authorized device 360 is joined to the virtual session, the authorized device 360 may be granted host controls over one or more multimedia streams generated and transmitted by the client device 540g. In other words, the authorized device 360 may control equipment on the client device 540g to gather additional information regarding the individual associated with the client device 540g or the incident 510.

In some embodiments, a map of the facility 512 may be generated to assist with the response efforts or identify a location of the client device 540g. A map may look similar to the illustrative example of FIG. 5 in that it may include a building layout of the facility 512. Additionally, the map may include identification of the client device 540g associated with the emergency beacon activation, as well as a location of the incident 510. For example, as shown, a map may indicate that the incident 510 is located in the hallway 508. Additionally, a map may indicate the location of the client device 540g in relation to the incident 510. As shown, the cubicle 506e or the client device 540g may be shaded or otherwise indicate that the cubicle 506e or the client device 540g are associated with the emergency beacon. In some embodiments, a different color or shading method may be used to indicate the proximity of the client device 540g to the incident 510. For example, a darker color or shade may be used to indicate that the client device 540g is within a predetermined proximity to the incident 510. If the client device 540g was further away from the incident 510, or outside a predetermined proximity, then the coloring or shading of the client device 540g on a map may be lighter. Such coloring method may provide a quick visual indication to authorized personnel on the location of the client device 540g with respect to the incident 510. Any format of identification may be used to illustrate a client device's vicinity to the incident 510, including a distance from a client device to an incident.

It should be appreciated that while only one incident 510 is illustrated in FIG. 5, there may be any number of incidents 510 occurring simultaneously or sequentially within the facility 512. In some embodiments, a movement map may be generated to show movement of the client device 540g. For example, the movement map may illustrate the movement of an individual associated with the client device 540g throughout the facility 512 to aid in response efforts.

Figure 7:
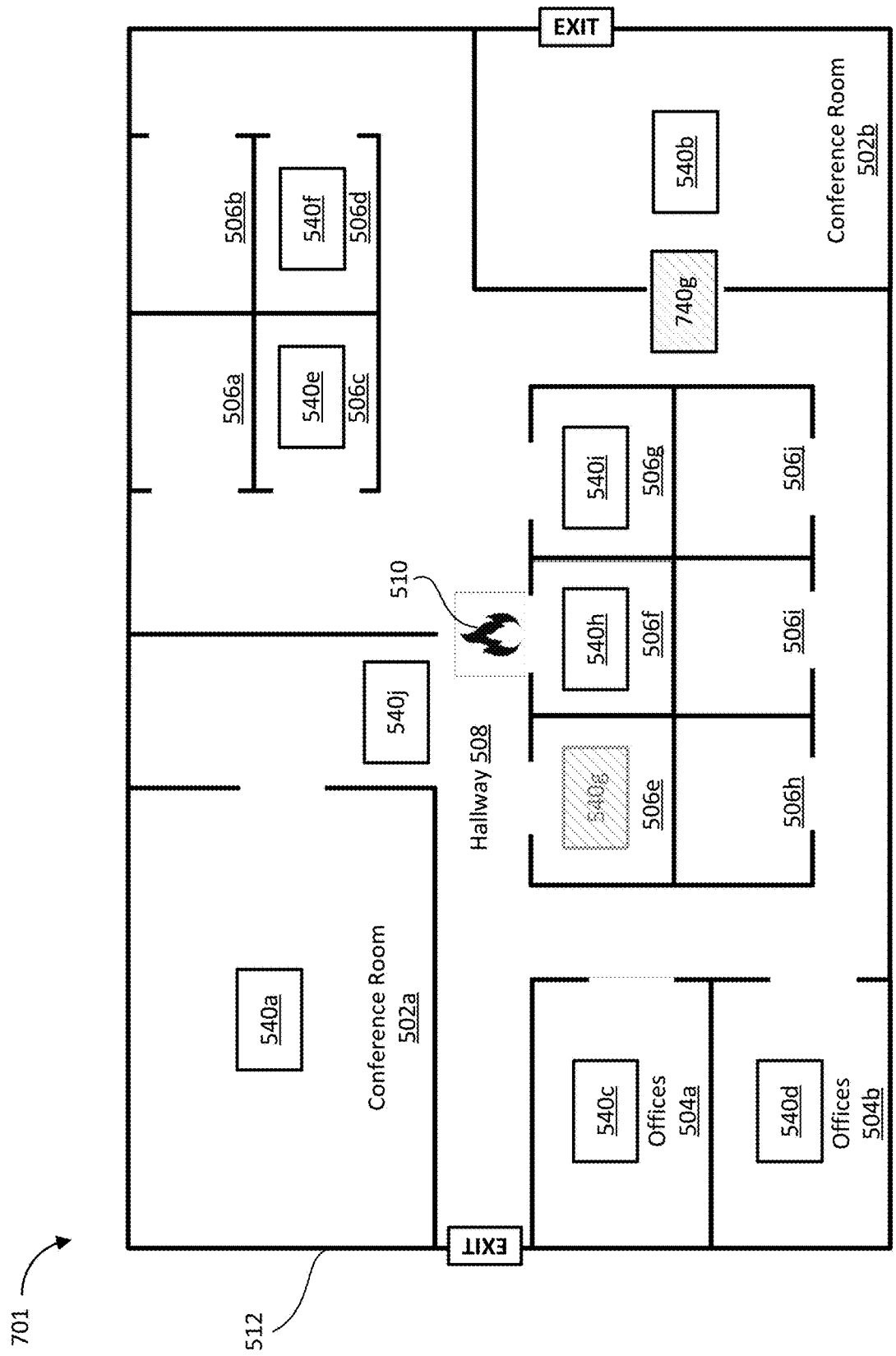
FIG. 7 illustrates an example overview of identifying movement of a client device during an emergency, according to an embodiment herein.

Referring now to FIG. 7, an example movement map 701 of the client device 540g is provided, according to an embodiment herein. The illustrated movement map 701 may illustrate the movement of the client device 540g throughout the facility 512. For example, the individual associated with the client device 540g may be trying to avoid the incident 510 and find an exit to the facility 512. As can be appreciated, during an incident, such as the incident 510, an individual may have a hard time finding an exit or a way out of the facility 512. For example, smoke may make it difficult to see, the incident 510 may impede normal exit routes, or the individual may not be familiar with the layout of the facility 512. As such, the movement map 701 may provide important information to officials and first responders.

As shown, the individual associated with the client device 540g may move to a different location within the facility 512. To indicate that the client device 540g is no longer at a first or previous location, the client device 540g may be shaded, greyed, or changed colors to indicate that this is a previous location. The movement map 701 may indicate a current or second location of the client device 740g. The client device 740g may be the same as the client device 540g except at a current time. As illustrated, the client device 740g may be located near the conference room 502b. The movement map 701 may indicate that the individual associated with the client device 540g/740g is no longer in the cubicle 506e.

Similar to how the location of the client device 540g is initially determined, the video conference provider 310 may be able to update the location of the client device 540g/740g as the individual moves. For example, the client device 740g may no longer have a Bluetooth connection with the client device 540h and instead now have a Bluetooth connection with the client device 540b. In another example, the client device 740g may have changed WiFi connections or may now ping a different cell tower depending on the extent of the movement.

Figure 8:
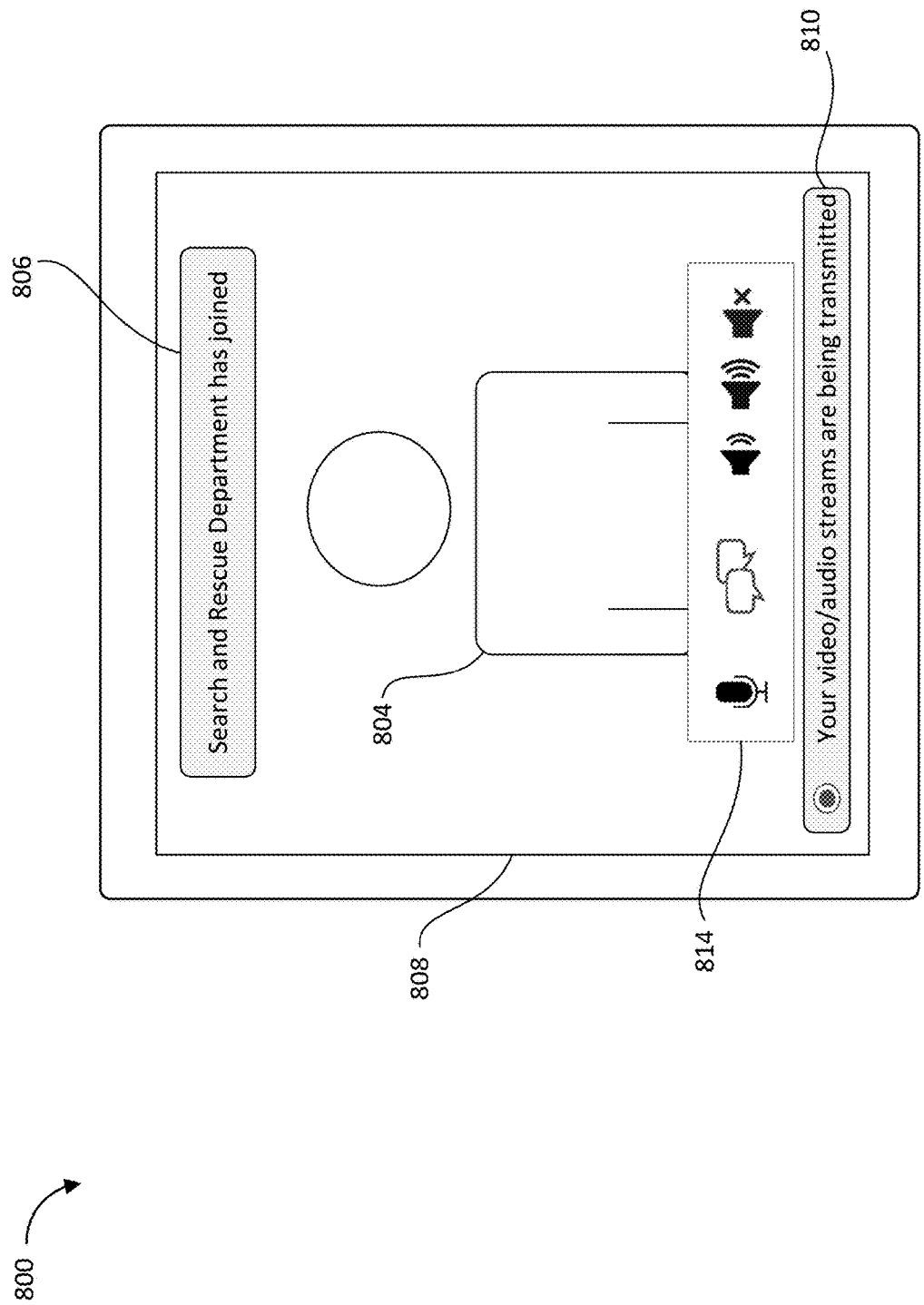
FIG. 8 illustrates a graphical user interface (GUI) for identifying a location of a client device during an emergency, according to an embodiment herein.

Referring now to FIG. 8, a GUI 800 provided to a client device that is part of an emergency beacon system is illustrated, according to an embodiment herein. For example, the GUI 800 may be provided to the client device 540g upon establishing the virtual session responsive to activation of the emergency beacon.

As shown, the GUI 800 may include a display 808. The display 808 may provide a video stream of a speaking participant 804. The participant 804 may be a first responder or official joined to the virtual session with the client device 540g via the authorized device 360. Along with a video stream from the authorized device 360, an audio stream may also be provided. In some embodiments, instead of an audio stream, a transcription of the speaking participant 804's audio stream may be provided. It can be appreciated that there may be scenarios in which playing audio from the client device 540g during an incident may be undesirable as it could pose a danger to individuals near the client device 540g. In still other embodiments, a map, drawing, or digital signage may be transmitted to the client device 540g to assist in the response to the incident. For example, a map of the nearest exits or a rescue route may be transmitted to the client device 540g.

The display 808 may also provide a notification 806. The notification 806 may be provided to the individual associated with the client device 540g to provide context regarding the speaking participant 804. For example, the notification 806 may be provided via the display 808 when the authorized device 360 joins the virtual session. In some embodiments, the notification 806 may include context such as a jurisdiction, descriptor, title, or status of the speaking participant 804. For example, as shown, the notification 806 may indicate that the speaking participant 804 is from the Search and Rescue Department.

The display 808 may also include a dashboard 814. The dashboard 814 may provide a limited number of selections. For example, the dashboard 814 may only include selections to allow the client device 540g to activate a microphone to allow the individual to speak to the speaking participant 804 (e.g., the microphone icon), message the speaking participant 804 (e.g., the chat message icon), or volume controls. Limiting the number of controls on the dashboard 814 can provide a simple display to the individual during an emergency incident, where providing too many options could lead to confusion or undue delay in communication attempts with officials or first responders.

In some embodiments, the display 808 may also include a notification 810. The notification 810 may indicate that the audio or video streams from the client device 540g are being transmitted to the authorized device 360 via the virtual session. For example, the authorized device 360 may activate the equipment of the client device 540g such to receive a video and audio stream from the client device 540g. In an illustrative scenario, the authorized device 360 may activate a camera on the client device 540g to view the surroundings of the individual to aid in finding an exit route. Upon receiving the video and/or audio streams from the client device 540g, the display 808 may provide the notification 810 to indicate the transmission of the audio and video streams. This may provide important information to the individual associated with the client device 540g, such as letting them know that officials, first responders, or other authorized individuals can see and hear them.

Figure 9:
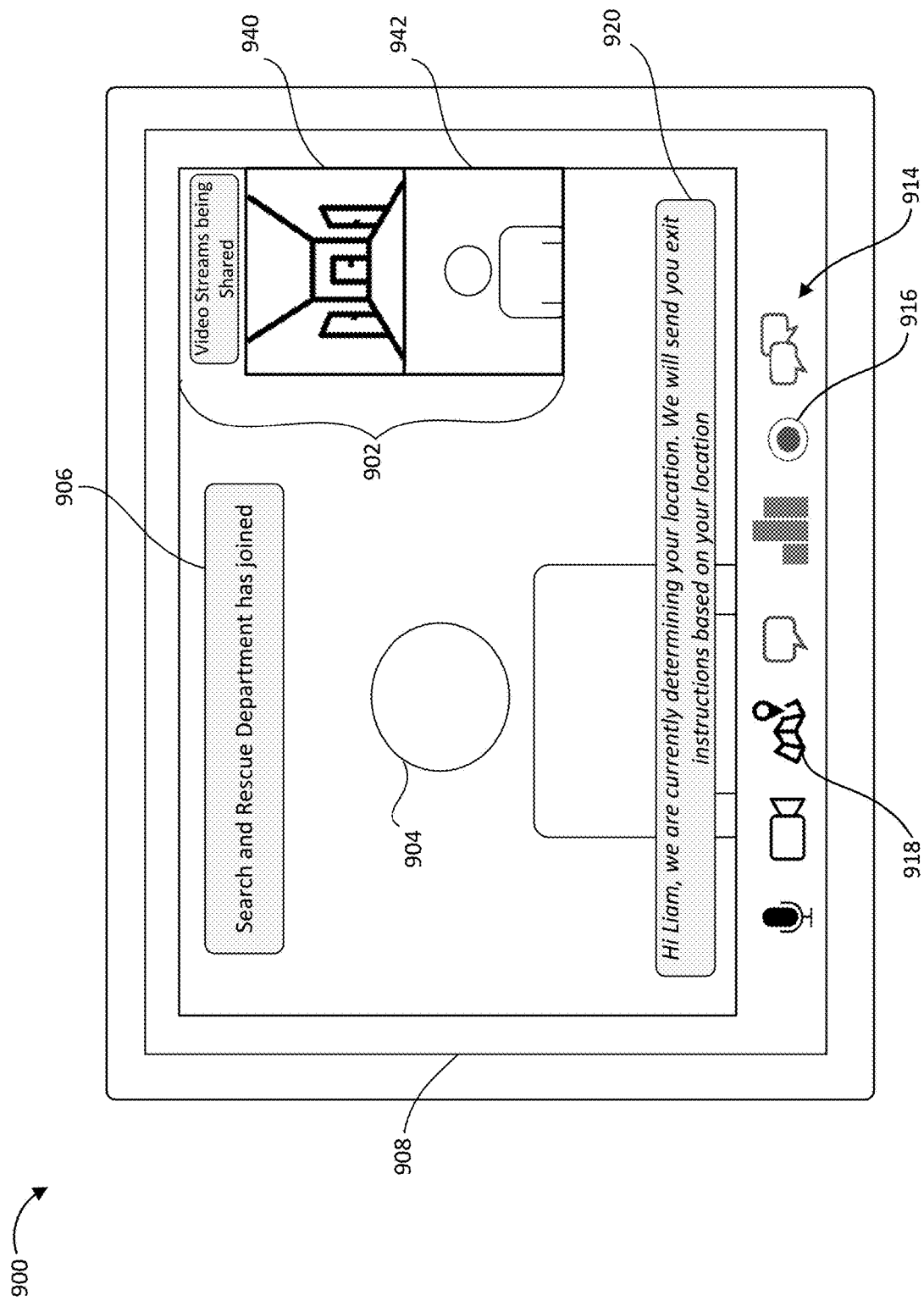
FIG. 9 illustrates another GUI for identifying a location of a client device during an emergency, according to an embodiment herein.

Referring now to FIG. 9, an example graphical user interface (GUI) 900 for identifying a location of a client device during an emergency is illustrated, according to an embodiment herein. For example, the GUI 900 may be provided to any client device that is joined to the virtual session, such as the client device 540g or the authorized device 360. In some embodiments, the GUI 900 may only be provided to client devices associated with the response side of the virtual session, such as only to the authorized device 360. In an example embodiment, the GUI 900 may be provided to a second authorized device who has joined the virtual session as part of the response effort. Client devices that are associated with activation of the emergency beacon, such as the client device 540g, may receive a different GUI, such as the GUI 800 described above with respect to FIG. 8.

As shown, the GUI 900 may include a display 908. The display 908 may include a video stream(s) display 902 of video streams received from client devices associated with activation of the emergency beacon, such as the client device 540g. For example, the video stream(s) display 902 may include a first video stream 940 and a second video stream 942 received from the client device 540g. The first video stream 940 and the second video stream 942 may provide information to the authorized device 360 of the surrounding vicinity to the client device 540g. For example, the first video stream 940 may be from a first camera on the client device 540g and may provide a view of what is in front of the individual associated with the client device 540g. This can allow officials or first responders to provide guidance on exit paths or better assess the individual's surroundings. The second video stream 940 may be from a second camera on the client device 540g and may provide a view of the individual associated with the client device 540g. This can allow officials or first responders to assess the status of the individual or provide first aid directions. As can be appreciated, in this example scenario, both a forward facing and rear facing camera on the client device 540g may be simultaneously activated. In other embodiments, only one camera may be activated, or more than two cameras may be activated.

Similar to the display 808, the display 908 may include a speaking participant 904. The speaking participant 904 may be a video stream from an authorized device, such as the authorized device 360. As noted above, once the virtual session is initiated, video and audio streams may be exchanged between the virtual meeting participants, such as between the client device 540g and the authorized device 360. The display 908 may display the video stream of a currently speaking participant 904, which may be a first responder or official associated with the authorized device 360. The audio stream from participant 904 may also be transmitted along with the video stream. In some embodiments, more than one participant may be speaking, and in such cases, display 908 may include two or more windows providing the video streams from the speaking participants.

To indicate to the viewing individual, who is speaking, an indication 906 may be provided. The indication 906 may identify an authorized agency for which the participant 904 corresponds. The indication 906 can provide important context about the participant 904, such as status, title, or other information to the viewing individual. In some embodiments, instead of a banner, like the indication 906, the background of the display 908 may change colors, highlight, pulse, or toggle in size to indicate the context associated with the participant 904.

The display 908 may include a dashboard 914 containing one or more action selections. For example, the dashboard 914 may include a recording selection 916 that allows a participant to record the audio and video streams during the virtual session. This may be important for record keeping purposes or trainings subsequent to this incident. In some embodiments, the dashboard 914 may include other selections such as a chat selection, a polling selection, and the like.

In some embodiments, the dashboard 914 may include a map selection 918. The map selection may allow a participant, such as a first responder or official, to view a movement map, such as the movement map 701. For example, upon selection of the map selection 918, a display of the movement map 701 may be provided on the GUI 900. As noted above, the movement map 701 may provide information as to movement of a client device associated with activation of the emergency beacon, such as the client device 540g.

As noted above, the authorized device 360 may be granted host controls over the virtual session. The host controls may allow the authorized device the ability to join one or more authorized devices to the virtual session. Additionally, the host controls may allow the authorized device the ability to control equipment on the client device 540g for generation and transmission of one or more multimedia streams. For example, the host controls may allow the authorized device 360 to control the cameras on the client device 540g to generate the first video stream 940 and the second video stream 942. In another example, the host controls may allow the authorized device 360 to activate a microphone on the client device 540g to generate and receive an audio stream from the client device 540g. As can be appreciated, this may allow officials or first responders to access information regarding the client device 540g's or individual associated with the client device 540g's status. For example, if the individual is incapacitated or unable to activate the client device 540g himself or herself, then officials or first responders can activate the client device 540g to open communication between the authorized device 360 and the client device 540g.

In some embodiments, a transcription 920 of an audio stream from the authorized device 360 may be provided on the display 908. For example, the transcription 920 may be provided to the client device 540g in the event that the surroundings of the client device 540g are too loud for the individual to hear any incoming audio streams or the individual is hearing impaired. Additionally, in some embodiments, a transcription from audio streams transmitted during a virtual session may be generated for record or training purposes.

Figure 10:
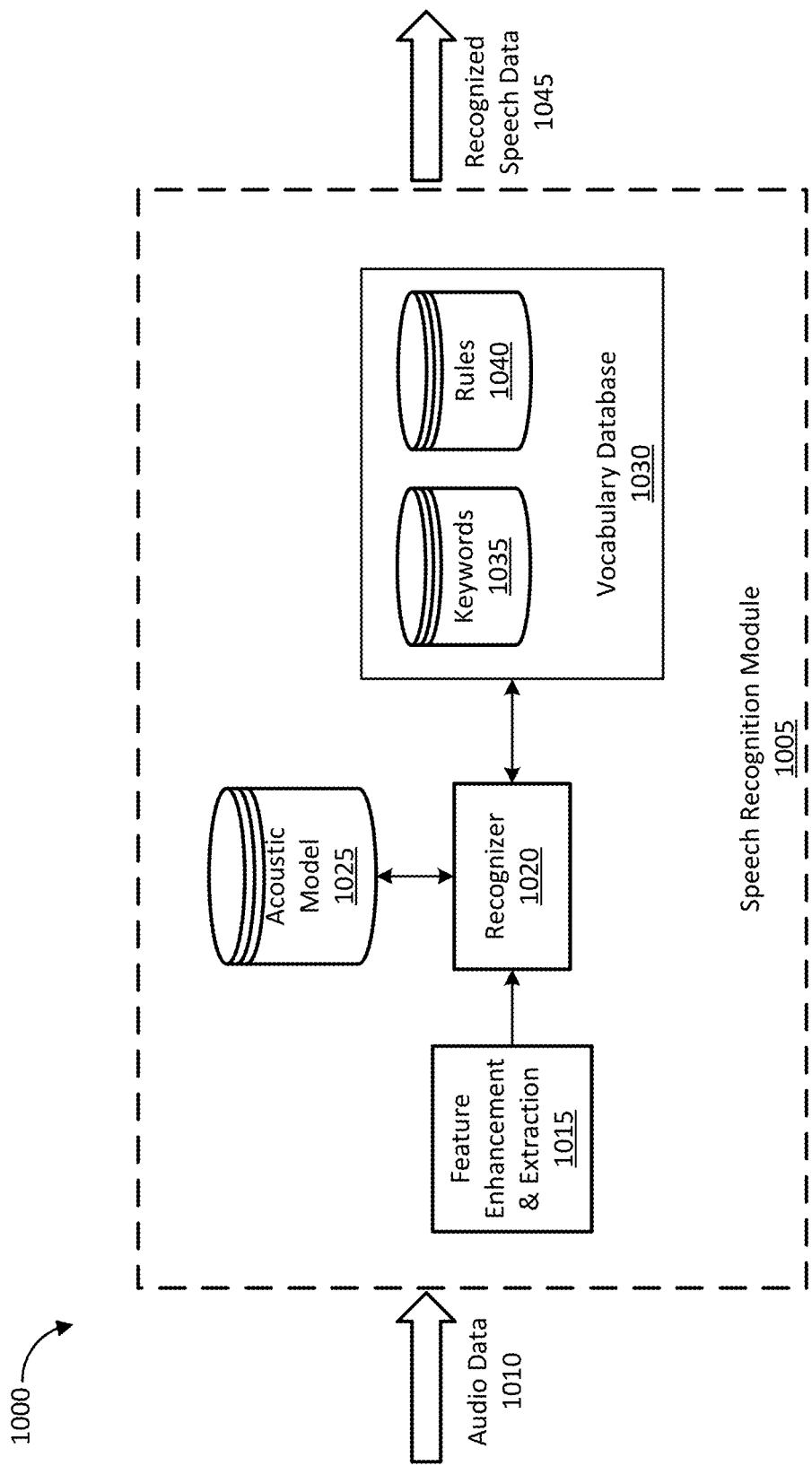
FIG. 10 illustrates an example speech recognition system that may be locally or remotely executed, according to an embodiment herein.

Turning now to FIG. 10, an example speech recognition system 1000 that may be used for identifying a location of a client device during an emergency is provided. The speech recognition system 1000 may be executed locally or remotely. For example, the speech recognition system 1000 may be locally executed on a client device, however, in other embodiments, the speech recognition system 1000 may be cloud-based and/or remotely executed by a video conference provider, such as the video conference provider 310, or a third-party system.

Figure 11:
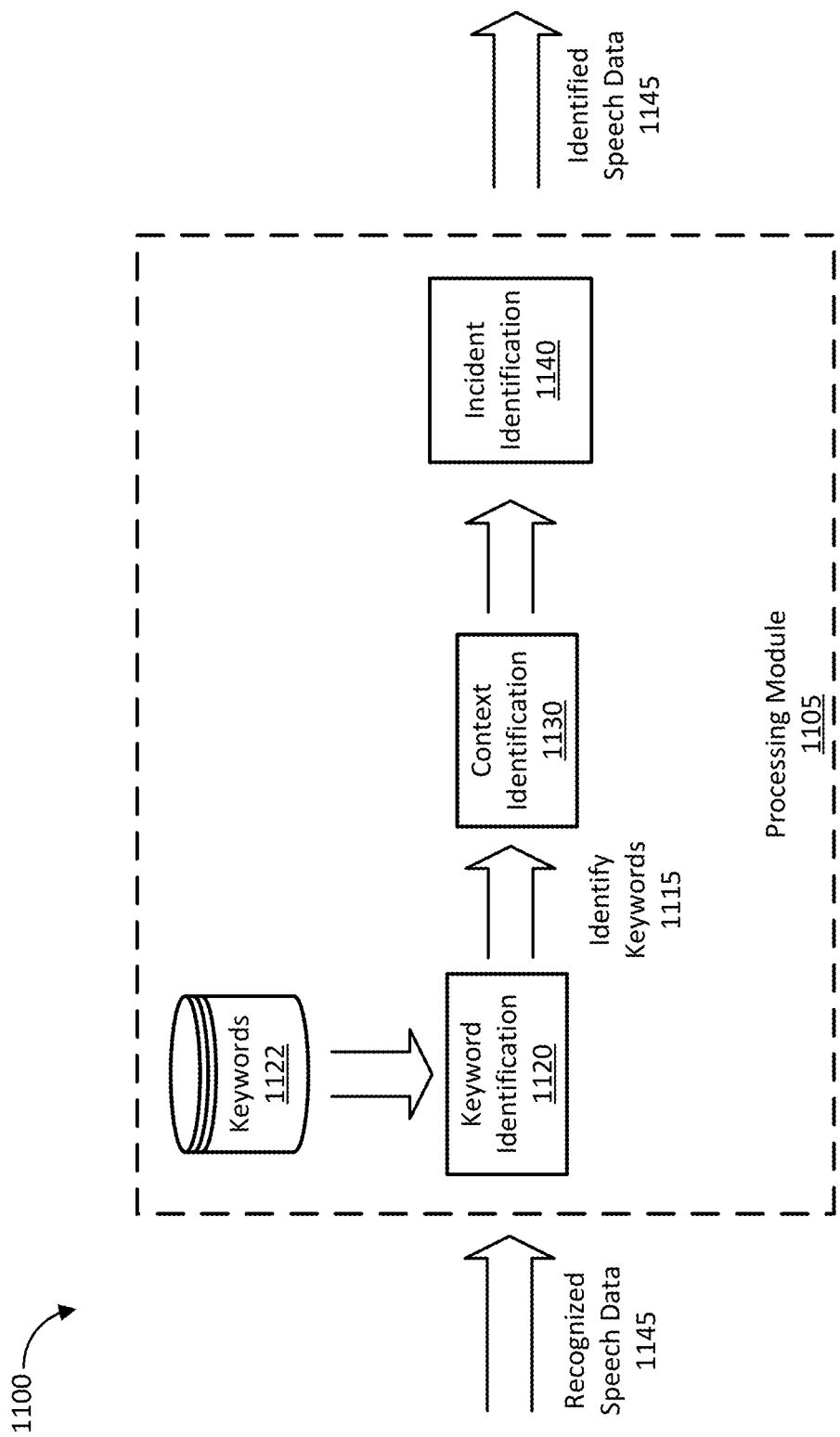
FIG. 11 illustrates an example system that may be locally or remotely executed, according to an embodiment herein.

The speech recognition system 1000, along with the system 1100 described in greater detail with respect to FIG. 11, may be used to perform one or more of the functions for identifying a location of a client device described herein. For example, in some embodiments, the speech recognition system 1000 may be used to identify keywords or audio patterns indicating an incident event or providing context for an incident event. For example, the speech recognition system 1000 may identify keywords in an audio stream from the client device 540g indicating that the incident event 510 is a fire. In other embodiments, the speech recognition system 1000 may be used to provide a live transcription of a speaking participant's audio stream or a transcription of audio streams exchanged during the virtual session.

To perform speech recognition, the speech recognition system 1000 may include a speech recognition module 1005. The speech recognition module 1005 may receive audio data 1010. The audio data 1010 may correspond to audio captured by the client device 340*a*, for example by a microphone. In other embodiments, the audio data 1010 may be received from the video conference provider 310. The audio data 1010 may be a recording of an audio track or may be a transcript of the audio track. The speech recognition module 1005 may be or include a speech recognition system or model as known in the art. The following is an example speech recognition module following an example speech recognition process; however, it should be understood that other speech recognition modules or processes may be used.

Once the audio data 1010 is received by the speech recognition module 1005, the audio data 1010 may be processed by a feature enhancement and extraction module 1015. The feature enhancement and extraction module 1015 may analyze the audio data for features corresponding to words and then enhance and extract any identified features. The identified features may correspond to audio waveforms present in human speech.

The speech recognition module 1005 may also include a recognizer 1020. The recognizer 1020 may receive the identified features from the audio data 1010. The recognizer 1020 may employ an acoustic model 1025 and a vocabulary database 1030 to determine or associate the identified features in the audio data 1010 to one or more words.

In an example embodiment, the acoustic model 1025 may analyze the raw audio waveforms in the identified features and determine a corresponding phoneme for each waveform. In some embodiments, this is performed at the character or subword level. The vocabulary database 1030 may be a language model. The vocabulary database 1030 may include a rules database 1040 and a word database 1035. The rules database 1040 may provide various rules for speech, allowing the recognizer to discard any association of identified features (e.g., audio waveforms) to phonemes that are improbable given the constraints of proper grammar and the topic of discussion. Once an appropriate mapping of the identified features to phonemes is generated, the recognizer 1020 may determine words associated with the phonemes. The words may be based on the words database 1035.

Once the phonemes are associated with respective words, recognized speech data 1045 is generated. It should be understood that this process may be performed nearly instantaneously. For example, the speech recognition module 1005 may generate the recognized speech data 1045 during the meeting as the audio streams are being received by the video conference provider 310 or another system that is hosting the speech recognition system 1000. The recognized speech 1045 may be then used to perform one or more incident response functions, such identifying an incident.

Turning now to FIG. 11, an example system 1100 is provided. The system 1100 may include processing module 1105 that is used to perform one or more of the functions described herein. For example, in one case, the recognized speech 1045 may be received from the speech recognition system 1000 to identify or provide context to an incident from an audio stream received from the client device 540*g*.

The recognized speech 1045 may be received by the keyword identification system 1120. The keyword identification system 1120 may identify one or more keywords in the recognized speech data 1145. The database of known keywords 1122 may be queried to identify any keywords in the track of recognized speech data 1045. Keywords in the keyword database 1122 may be based on keywords associated with common incident events. For example, keywords may include words like "fire," "help," "stop," and the like. In some embodiments, keywords may include one or more emotion expressions, such as screaming or crying.

It should be understood that a keyword may include more than one word. For example, "get out of here" may be a keyword indicating that an individual is seeking a means of escape. Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "caught," "catch," and "catching." In some examples each of these may be a distinct keyword, while in other examples, the variants may be associated with a base term, e.g., "catch," that is used as the keyword. However, any suitable approach to recognizing keywords may be used.

If one or more keywords 1115 is recognized, the processing module 1105 then may identify a context 1130 associated with the keyword 1115. In this example, to identify a context, the processing module 1105 may employ a trained machine learning ("ML") technique to semantically analyze the speech or transcript associated with the identified keyword 1115 to determine additional related keywords and/or descriptors. To perform the analysis, the trained ML technique may be provided the keyword(s) and a predetermined number of words near the keyword, e.g., preceding and following the keyword(s), such as five to ten words preceding and following the keyword(s). Words such as articles (e.g., "a", "the") or prepositions such as "of" or "for" may be omitted from the word count in some examples.

Since people may use jargon or colloquial terms to refer to particular actions, the context identification 1130 functionality may normalize recognized words to specific meanings. For example, the terms "kids," "offspring," "kiddos," "little ones," etc. all refer to children. Thus, the context identification 1130 functionality may map such terms to have a single meaning (e.g., children). Such mappings may be provided for multiple different phrases and corresponding terms. Similarly, synonyms or words related to keywords may also be identified.

Once the context identification 1130 has identified the one or more keywords 1115 and identified the context of the identified keywords 1115, the processing module 1105 may perform an incident identification 1140. The processing module 1105 may determine, based on the identification of the keywords 1115, and the context of the keywords, that the keywords 1115 correspond to an incident. Based on predetermined keywords and context, the incident identification 1140 may determine an incident event corresponding to identified keywords 1115. For example, the incident identification 1140 may determine that the incident 510 is a fire based on the identified keywords "fire" or "burning" in an audio stream received from the client device 540*g*. In such an example, the incident identification 1140 may be able to flag for the authorized device that the incident likely involves fire since the identified keywords include "fire" or "burning."

The incident identification 1140 may process the keywords 1115 in the audio data to generate identified speech data 1145. The identified speech data 1145 may include speech data that has been identified as being relevant to an incident event, as described above. In some embodiments, the identified speech data 1145 may be used to generate an alert or information containing context of the incident event for the authorized device.

Figure 12:
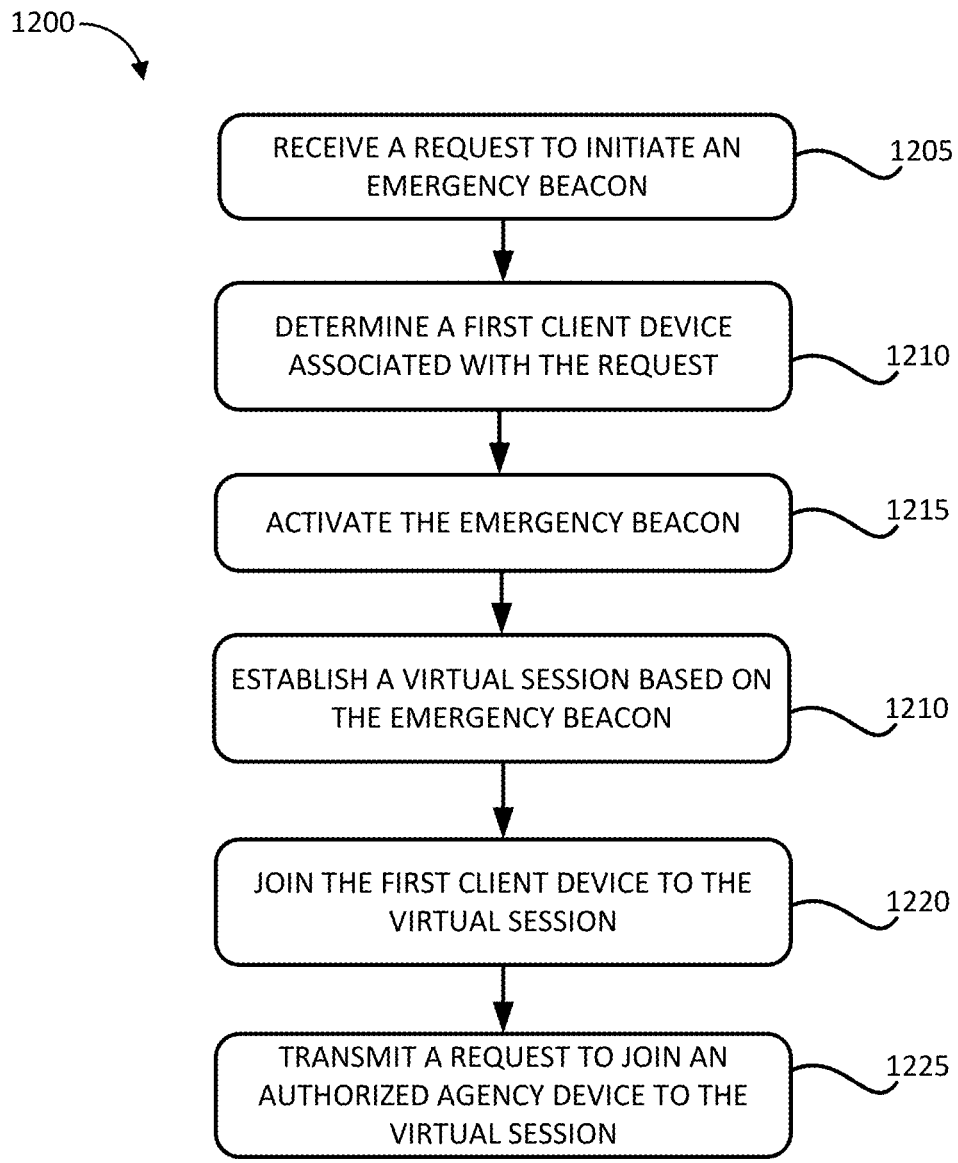
FIG. 12 illustrates an exemplary method for identifying a location of a client device during an emergency, according to an embodiment herein.

Referring now to FIG. 12, a flowchart of an example method 1200 for identifying a location of a client device during an emergency is provided, according to an embodiment herein. The description of the method 1200 in FIG. 12 will be made with reference to FIGS. 3-11, however any suitable system according to this disclosure may be used, such as the example systems 100 and 200, shown in FIGS. 1 and 2.

The method 1200 may include step 1205. At step 1205, the method 1200 may include receiving a request to initiate an emergency beacon. For example, the video conference provider 310 may receive the request to initiate the emergency beacon from a client device, such as the client device 340a. In an illustrative example, the client device 340a may be associated with an individual in need of assistance. In another embodiment, the request to initiate the emergency beacon may be received from the authorized device 360. In an illustrative example, the authorized device 360 may be associated with an official, administrator, or a first responder.

The method 1200 may also include steps 1210 and 1215. At step 1210, the method 1200 may include determining a first client device associated with the request. For example, the request to initiate the emergency beacon may include information relating to an individual in need of assistance. As such, the video conference provider 310 may determine a first client device associated with the individual or information included in the emergency beacon. At step 1215, the method 1200 may include activating the emergency beacon for the first client device. For example, the video conference provider 310 may activate the emergency beacon for the client device 540g.

The method 1200 may also include steps 1220 and 1225. At step 1220, the method 1200 may include establishing a virtual session based on the emergency beacon. For example, the video conference provider 310 may establish a virtual session responsive to activating the emergency beacon. At step 1225, the method 1200 may include joining the first client device to the virtual session without input from the first client device. For example, the video conference provider 310 may automatically join the client device 540g to the virtual session without any input from the client device 540g.

The method 1200 may also include step 1230. At step 1230, the method 1200 may include transmitting a request to join an authorized device to the virtual session. For example, the video conference provider 310 may transmit a request to join the authorized device 360 to the virtual session. In an illustrative example, upon establishing the virtual session, the video conference provider 310 may automatically join the authorized device 360 to the virtual session. In some embodiments, upon joining the authorized device 360 to the virtual session, the video conference provider 310 may generate a notification of the presence of the authorized device 360 in the virtual session. In an illustrative example, the video conference provider 310 may receive one or more multimedia streams from the first client device 540g via the virtual session. The video conference provider 310 may transmit the one or more multimedia streams from the first client device 540g to the authorized device 360. Similarly, the video conference provider 310 may receive one or more multimedia streams from the authorized device 360 and transmit the one or more multimedia streams from the authorized device 360 to the first client device 540g.

In some embodiments, the video conference provider 310 may grant the authorized device 360 host controls for the virtual session. Host controls may allow the authorized device 360 to modify one or more settings associated with a first multimedia stream received from the first client device. For example, the authorized device 360 may transmit a request to modify one or more settings associated with the first multimedia stream and receive a modified first multimedia stream, from the first client device, based on the request. Example settings associated with the first multimedia stream that the authorized client device 360 may request to modify include one or more of a request to activate a camera associated with the first client device, a request to activate a microphone associated with the first client device, a request to activate a speaker associated with the first client device, a request to increase a volume of an audio stream transmitted by the first client device, or a request to modify a video stream transmitted by the first client device.

In some embodiments, the method 1200 may also include determining a location of the first client device and transmitting the location of first client device to the authorized device. For example, the video conference provider 310 may determine the location of the first client device based on an IP address, a Bluetooth connection, GPS data, or cellular network associated with the first client device. In an illustrative example, the method 1200 may also include determining a status of the first client device (e.g., whether the first client device is operable or activated) and transmitting the status of the first client device to the authorized device.

Figure 13:
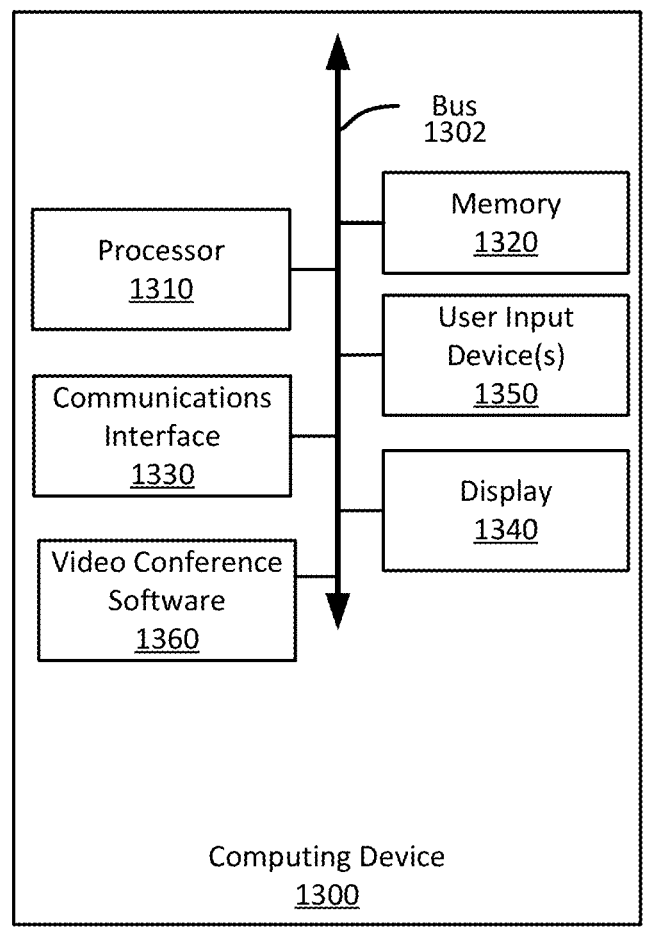
FIG. 13 shows an example computing device suitable for identifying a location of a client device during an emergency, according to this disclosure.

Referring now to FIG. 13, FIG. 13 shows an example computing device 1300 suitable for use in example systems or methods providing an emergency beacon system. The example computing device 1300 includes a processor 1310 which is in communication with the memory 1320 and other components of the computing device 1300 using one or more communications buses 1302. The processor 1310 is configured to execute processor-executable instructions stored in the memory 1320 to perform one or more methods for identifying a location of a client device during an emergency, such as part or all of the example method 1200, described above with respect to FIG. 12. For example, the video conferencing software 1360 provided on the computing device 1300 may provide instructions for performing one or more steps of the methods 1200 for identifying a location of a client device during an emergency. The computing device, in this example, also includes one or more user input devices 1350, such as a keyboard, mouse, touchscreen, video input device (e.g., one or more cameras), microphone, etc., to accept user input. The computing device 1300 also includes a display 1340 to provide visual output to a user.

The computing device 1300 also includes a communications interface 1330. In some examples, the communications interface 1330 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Examples

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a method comprising: receiving, by a video conference provider, a request to initiate an emergency beacon; determining, by the video conference provider, a first client device associated with the request; activating, by the video conference provider, the emergency beacon for the first client device; establishing, by the video conference provider, a virtual session based on the emergency beacon; joining, by the video conference provider, the first client device to the virtual session without input from the first client device; and transmitting, by the video conference provider, a request to join an authorized device to the virtual session.

Example 2 is the method of any previous or subsequent Example, the method further comprising: joining, by the video conference provider, the authorized device to the virtual session; and generating, by the video conference provider, a notification of the presence of the authorized device in the virtual session.

Example 3 is the method of any previous or subsequent Example, the method further comprising: determining, by the video conference provider, a location of the first client device; and transmitting, by the video conference provider, the location of the first client device to the authorized device.

Example 4 is the method of any previous or subsequent Example, wherein the location of the first client device is determined based on one or more of: an IP address; a Bluetooth connection; global positioning system (GPS) data; or cellular network data.

Example 5 is the method of any previous or subsequent Example, the method further comprising: determining, by the video conference provider, a status of the first client device; and transmitting, by the video conference provider, the status of the first client device to the authorized device.

Example 6 is the method of any previous or subsequent Example, wherein the request to initiate the emergency beacon is received by the video conference provider from the first client device.

Example 7 is the method of any previous or subsequent Example, wherein the request to initiate the emergency beacon is received by the video conference provider from the authorized device.

Example 8 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive, by a video conference provider, a request to initiate an emergency beacon; determine, by the video conference provider, a first client device associated with the request; activate, by the video conference provider, the emergency beacon for the first client device; establish, by the video conference provider, a virtual session based on the emergency beacon; automatically join, by the video conference provider, the first client device to the virtual session without input from the first client device; and transmit, by the video conference provider, a request to join an authorized device to the virtual session.

Example 9 is the system of any previous or subsequent Example, wherein the processor is configured to execute further processor-executable instructions stored in the non-transitory computer-readable medium to: join, by the video conference provider, the authorized device to the virtual session; and responsive to joining the authorized device to the virtual session, granting, by the video conference provider, host controls to the authorized device for the virtual session.

Example 10 is the system of any previous or subsequent Example, wherein the processor is configured to execute further processor-executable instructions stored in the non-transitory computer-readable medium to: receive, by the video conference provider, one or more multimedia streams from the authorized device; and transmit, by the video conference provider, the one or more multimedia streams from the authorized device to the first client device.

Example 11 is the system of any previous or subsequent Example, wherein the processor is configured to execute further processor-executable instructions stored in the non-transitory computer-readable medium to: receive, by the video conference provider, one or more multimedia streams from the first client device; and transmit, to the authorized device, the one or more multimedia streams from the first client device.

Example 12 is the system of any previous or subsequent Example, wherein the processor is configured to execute further processor-executable instructions stored in the non-transitory computer-readable medium to: receive, from the authorized device, an indication to modify one or more settings associated with a first multimedia stream of the one or more multimedia streams from the first client device; transmit, by the video conference provider, a signal to the first client device to modify the one or more settings associated with the first multimedia stream; and receive, from the first client device, a modified first multimedia stream based on the signal to modify the first multimedia stream.

Example 13 is the system of any previous or subsequent Example, wherein the signal to the first client device to modify the one or more settings associated with the first multimedia stream comprises at least one of: a request to activate a camera associated with the first client device; a request to activate a microphone associated with the first client device; a request to activate a speaker associated with the first client device; a request to increase a volume of an audio stream transmitted by the first client device; or a request to modify a video stream transmitted by the first client device.

Example 14 is the system of any previous or subsequent Example, wherein the processor is configured to execute further processor-executable instructions stored in the non-transitory computer-readable medium to: determine, by the video conference provider, a location of the first client device; and transmit, by the video conference provider, the location of the first client device to the authorized device.

Example 15 is a non-transitory computer-readable medium comprising processor-executable instructions configured to cause one or more processors to: receive, by a video conference provider, a request to initiate an emergency beacon; determine, by the video conference provider, a first client device associated with the request; activate, by the video conference provider, the emergency beacon for the first client device; establish, by the video conference provider, a virtual session based on the emergency beacon; automatically join, by the video conference provider, the first client device to the virtual session without input from the first client device; and transmit, by the video conference provider, a request to join an authorized device to the virtual session.

Example 16 is the non-transitory computer-readable medium of any previous or subsequent Example, wherein the processor is configured to execute further processor-executable instructions stored in the non-transitory computer-readable medium to: join, by the video conference provider, the authorized device to the virtual session; receive, by the video conference provider, one or more multimedia streams from the first client device; and transmit, to the authorized device, the one or more multimedia streams from the first client device.

Example 17 is the non-transitory computer-readable medium of any previous or subsequent Example, wherein the processor is configured to execute further processor-executable instructions stored in the non-transitory computer-readable medium to: receive, from the authorized device, a request for host controls over equipment of the first client device generating the one or more multimedia streams; and grant, by the video conference provider, the host controls over the equipment of the first client device for the authorized device.

Example 18 is the non-transitory computer-readable medium of any previous or subsequent Example, wherein the processor is configured to execute further processor-executable instructions stored in the non-transitory computer-readable medium to: determine, by the video conference provider, a location of the first client device; and transmit, by the video conference provider, the location of the first client device to the authorized device.

Example 19 is the non-transitory computer-readable medium of any previous or subsequent Example, wherein the location of the first client device is determined by one or more of: an IP address of the first client device; a Bluetooth connection of the first client device; global positioning system (GPS) data of the first client device; or cellular network data of the first client device.

Example 20 is the non-transitory computer-readable medium of any previous or subsequent Example, wherein the request to initiate the emergency beacon is received from one of: the first client device; or the authorized device.

That which is claimed is:

1. A method comprising:
receiving, by a video conference provider, a request to initiate an emergency beacon;
determining, by the video conference provider, a first client device associated with the request;
activating, by the video conference provider, the emergency beacon for the first client device;
responsive to the activating, causing the first client device to enable Bluetooth or WiFi connectivity;
receiving wireless connection information from the first client device indicating a location of the first client device within a facility based on the Bluetooth or WiFi connectivity;
establishing, by the video conference provider, a virtual session based on the emergency beacon;
joining, by the video conference provider, the first client device to the virtual session without input from the first client device; and
transmitting, by the video conference provider, a request to join an authorized device to the virtual session.

2. The method of claim 1, the method further comprising:
joining, by the video conference provider, the authorized device to the virtual session; and
generating, by the video conference provider, a notification of the presence of the authorized device in the virtual session.

3. The method of claim 2, the method further comprising:
determining, by the video conference provider, a location of the first client device; and
transmitting, by the video conference provider, the location of the first client device to the authorized device.

4. The method of claim 3, wherein the location of the first client device is determined based on one or more of:
an IP address;
a Bluetooth connection;
global positioning system (GPS) data; or
cellular network data.

5. The method of claim 1, the method further comprising:
determining, by the video conference provider, a status of the first client device; and
transmitting, by the video conference provider, the status of the first client device to the authorized device.

6. The method of claim 1, wherein the request to initiate the emergency beacon is received by the video conference provider from the first client device.

7. The method of claim 1, wherein the request to initiate the emergency beacon is received by the video conference provider from the authorized device.

8. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
receive, by a video conference provider, a request to initiate an emergency beacon;
determine, by the video conference provider, a first client device associated with the request;
activate, by the video conference provider, the emergency beacon for the first client device;
responsive to the activating, cause the first client device to enable Bluetooth or WiFi connectivity;
receive wireless connection information from the first client device indicating a location of the first client device within a facility based on the Bluetooth or WiFi connectivity;
establish, by the video conference provider, a virtual session based on the emergency beacon;
automatically join, by the video conference provider, the first client device to the virtual session without input from the first client device; and
transmit, by the video conference provider, a request to join an authorized device to the virtual session.

9. The system of claim 8, wherein the processor is configured to execute further processor-executable instructions stored in the non-transitory computer-readable medium to:
join, by the video conference provider, the authorized device to the virtual session; and
responsive to joining the authorized device to the virtual session, granting, by the video conference provider, host controls to the authorized device for the virtual session.

10. The system of claim 9, wherein the processor is configured to execute further processor-executable instructions stored in the non-transitory computer-readable medium to:
receive, by the video conference provider, one or more multimedia streams from the authorized device; and
transmit, by the video conference provider, the one or more multimedia streams from the authorized device to the first client device.

11. The system of claim 9, wherein the processor is configured to execute further processor-executable instructions stored in the non-transitory computer-readable medium to:
receive, by the video conference provider, one or more multimedia streams from the first client device; and
transmit, to the authorized device, the one or more multimedia streams from the first client device.

12. The system of claim 9, wherein the processor is configured to execute further processor-executable instructions stored in the non-transitory computer-readable medium to:
receive, from the authorized device, an indication to modify one or more settings associated with a first multimedia stream of the one or more multimedia streams from the first client device;
transmit, by the video conference provider, a signal to the first client device to modify the one or more settings associated with the first multimedia stream; and
receive, from the first client device, a modified first multimedia stream based on the signal to modify the first multimedia stream.

13. The system of claim 12, wherein the signal to the first client device to modify the one or more settings associated with the first multimedia stream comprises at least one of:
a request to activate a camera associated with the first client device;
a request to activate a microphone associated with the first client device;
a request to activate a speaker associated with the first client device;
a request to increase a volume of an audio stream transmitted by the first client device; or
a request to modify a video stream transmitted by the first client device.

14. The system of claim 8, wherein the processor is configured to execute further processor-executable instructions stored in the non-transitory computer-readable medium to:
determine, by the video conference provider, a location of the first client device; and
transmit, by the video conference provider, the location of the first client device to the authorized device.

15. A non-transitory computer-readable medium comprising processor-executable instructions configured to cause one or more processors to:
receive, by a video conference provider, a request to initiate an emergency beacon;
determine, by the video conference provider, a first client device associated with the request;
activate, by the video conference provider, the emergency beacon for the first client device;
responsive to the activating, cause the first client device to enable Bluetooth or WiFi connectivity;
receive wireless connection information from the first client device indicating a location of the first client device within a facility based on the Bluetooth or WiFi connectivity;

establish, by the video conference provider, a virtual session based on the emergency beacon;

automatically join, by the video conference provider, the first client device to the virtual session without input from the first client device; and transmit, by the video conference provider, a request to join an authorized device to the virtual session.

16. The non-transitory computer-readable medium of claim 15, wherein the processor is configured to execute further processor-executable instructions stored in the non-transitory computer-readable medium to:

join, by the video conference provider, the authorized device to the virtual session;

receive, by the video conference provider, one or more multimedia streams from the first client device; and transmit, to the authorized device, the one or more multimedia streams from the first client device.

17. The non-transitory computer-readable medium of claim 16, wherein the processor is configured to execute further processor-executable instructions stored in the non-transitory computer-readable medium to:

receive, from the authorized device, a request for host controls over equipment of the first client device generating the one or more multimedia streams; and grant, by the video conference provider, the host controls over the equipment of the first client device for the authorized device.

18. The non-transitory computer-readable medium of claim 15, wherein the processor is configured to execute further processor-executable instructions stored in the non-transitory computer-readable medium to:

determine, by the video conference provider, a location of the first client device; and transmit, by the video conference provider, the location of the first client device to the authorized device.

19. The non-transitory computer-readable medium of claim 18, wherein the location of the first client device is determined by one or more of:

an IP address of the first client device;

a Bluetooth connection of the first client device;

global positioning system (GPS) data of the first client device; or cellular network data of the first client device.

20. The non-transitory computer-readable medium of claim 15, wherein the request to initiate the emergency beacon is received from one of:

the first client device; or the authorized device.

* * * * *